(12) United States Patent
Shen et al.

(10) Patent No.: US 12,411,594 B2
(45) Date of Patent: Sep. 9, 2025

(54) WALLPAPER DISPLAY METHOD, ELECTRONIC DEVICE, AND STORAGE MEDIUM

(71) Applicant: HONOR DEVICE CO., LTD., Shenzhen (CN)

(72) Inventors: Cuo Shen, Shenzhen (CN); Liwei Huang, Shenzhen (CN); Taolin Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/291,486

(22) PCT Filed: Aug. 30, 2023

(86) PCT No.: PCT/CN2023/115912
§ 371 (c)(1),
(2) Date: Jan. 23, 2024

(87) PCT Pub. No.: WO2024/051556
PCT Pub. Date: Mar. 14, 2024

(65) Prior Publication Data
US 2025/0094028 A1    Mar. 20, 2025

(30) Foreign Application Priority Data

Sep. 9, 2022   (CN) .................. 202211102254.5

(51) Int. Cl.
*G06F 3/04845* (2022.01)
*G06F 3/04817* (2022.01)

(52) U.S. Cl.
CPC ...... *G06F 3/04845* (2013.01); *G06F 3/04817* (2013.01)

(58) Field of Classification Search
None
See application file for complete search history.

(56) References Cited

U.S. PATENT DOCUMENTS

2010/0099482 A1    4/2010  O'Connor et al.
2012/0313946 A1   12/2012  Nakamura et al.
(Continued)

FOREIGN PATENT DOCUMENTS

| CN | 105242826 A | * | 1/2016 | |
| CN | 106708508 A | * | 5/2017 | ........... G06F 3/0484 |

(Continued)

*Primary Examiner* — Kirk W Hermann
(74) *Attorney, Agent, or Firm* — Fish & Richardson P.C.

(57) ABSTRACT

A wall paper display method includes: obtaining, in response to a first select operation of a user, an image respectively corresponding to each graphic layer from a gallery, where each graphic layer corresponds to a different image, adjusting a position and a size of the image respectively corresponding to each graphic layer, obtaining, in response to an interface switching operation, a target video of changing from a scene image of a current preset interface to a scene image of a next preset interface, where a scene image of each preset interface is obtained by a virtual camera by photographing a scene including all graphic layers based on a photographing angle corresponding to the preset interface; and using the target video as a wallpaper of the electronic device, and displaying the wallpaper.

20 Claims, 18 Drawing Sheets

(56) References Cited

U.S. PATENT DOCUMENTS

2023/0326393 A1* 10/2023 Huang .............. H04M 1/72454
　　　　　　　　　　　　　　　　　　　　　　345/55
2024/0312103 A1* 9/2024 Zhang .................... G06T 13/80

FOREIGN PATENT DOCUMENTS

| CN | 109460181 | A | | 3/2019 |
|---|---|---|---|---|
| CN | 109743464 | A | | 5/2019 |
| CN | 114115616 | A | * | 3/2022 |
| CN | 114244953 | A | | 3/2022 |
| CN | 114296840 | A | | 4/2022 |
| CN | 114780012 | A | | 7/2022 |
| CN | 115695634 | A | | 2/2023 |
| WO | 2022042180 | A1 | | 3/2022 |

* cited by examiner

CONT.
FROM 10a  10b

WALLPAPER DISPLAY METHOD, ELECTRONIC DEVICE, AND STORAGE MEDIUM

CROSS-REFERENCE TO RELATED APPLICATIONS

This application is a national stage of International Application No. PCT/CN2023/115912, filed on Aug. 30, 2023, which claims priority to Chinese Patent Application No. 202211102254.5, filed on Sep. 9, 2022. The disclosures of the aforementioned applications are hereby incorporated by reference in their entireties.

TECHNICAL FIELD

This application relates to the field of terminals, and in particular, to a wallpaper display method, an electronic device, and a storage medium.

BACKGROUND

A display screen of a smart device generally displays a wallpaper, and a user may select different wallpapers to beautify the display screen. The wallpaper generally includes a planar single-layer wallpaper and a three-dimensional dynamic wallpaper.

However, a dynamic wallpaper is generally a wallpaper preset by a system, a range of selectable dynamic wallpapers is small, and the user cannot use a picture photographed by the user as a dynamic wallpaper. As a result, the interactivity of a wallpaper of an electronic device is reduced. In addition, a static wallpaper displayed by the electronic device also cannot be freely edited based on a requirement of the user, and the interactivity of the wallpaper of the electronic device is reduced consequently.

SUMMARY

To resolve the foregoing technical problems, this application provides a wallpaper display method, an electronic device, and a storage medium, so that the electronic device can edit a wallpaper based on an image selected by a user, thereby improving the interactivity between the electronic device and the user.

According to a first aspect, this application provides a wallpaper display method, applied to an electronic device. The method includes: obtaining, in response to a first select operation of a user, an image respectively corresponding to each graphic layer, where each graphic layer corresponds to a different image; adjusting a position and a size of the image respectively corresponding to each graphic layer; obtaining, in response to an interface switching operation, a target video of changing from a scene image of a current preset interface to a scene image of a next preset interface, where a scene image of each preset interface is obtained by a virtual camera by photographing a scene including all graphic layers based on a photographing angle corresponding to the preset interface; and using the target video as a wallpaper of the electronic device, and displaying the wallpaper.

In this way, the scene image corresponding to each preset interface is obtained by the virtual camera by performing photographing according to a respective corresponding photographing angle, so that the scene image of each preset interface includes a different depth of field. The photographing angle includes: a photographing height, a photographing distance, and a photographing direction. During interface switching, the electronic device may generate the target video of changing from the scene image of the current preset interface to the scene image of the next preset interface, so that the target video may present changes of different depths of field. Therefore, in an interface switching process, the wallpaper may present a dynamic effect that the depth of field changes, thereby improving the interactivity and interestingness with the user. In addition, a plurality of graphic layers exist, and the image corresponding to each graphic layer may be customized by the user, so that the interestingness of the user in editing the wallpaper is improved, and the scene image corresponding to each preset interface meets a requirement of the user.

According to the first aspect, the obtaining, in response to an interface switching operation, a target video of changing from a scene image of a current preset interface to a scene image of a next preset interface includes: obtaining, in response to the interface switching operation, the scene image corresponding to the current preset interface and the scene image corresponding to the next preset interface; and generating the target video based on the scene image corresponding to the next preset interface and the scene image corresponding to the current preset interface. In this way, the electronic device may generate a corresponding video based on the interface switching operation in real time, thereby improving the accuracy of displaying the target video.

According to the first aspect, before the obtaining, in response to an interface switching operation, a target video of changing from a scene image of a current preset interface to a scene image of a next preset interface, the method includes: obtaining the scene image corresponding to each preset interface; and generating, based on each preset interface switching relationship and the scene image corresponding to each preset interface, a video matching each interface switching relationship, where the interface switching relationship is used for indicating a correspondence between an interface before switching and an interface after switching; and the obtaining, in response to an interface switching operation, a target video of changing from a scene image of a current preset interface to a scene image of a next preset interface includes: determining an interface switching relationship in response to the interface switching operation; and obtaining, based on the interface switching relationship, a video matching the interface switching relationship as the target video.

In this way, a mobile phone may pre-store the target video matching each interface switching relationship, so that when a corresponding interface switching relationship is detected, the mobile phone may quickly display the target video. In this way, processing power consumption of the mobile phone is reduced, duration for obtaining the target video is shortened, and a problem that the electronic device is lagged when displaying the wallpaper is avoided.

According to the first aspect, the obtaining the scene image corresponding to a preset interface includes: obtaining a photographing angle corresponding to the preset interface, where the photographing angle includes: a photographing distance, a photographing height, and a photographing direction; obtaining a focusing position in the scene including all the graphic layers; and indicating the virtual camera to focus on the focusing position and photograph the scene including all the graphic layers based on the photographing angle corresponding to the preset interface, to obtain the scene image corresponding to the preset scene. In this way, the virtual camera obtains the focusing position of the scene including all the graphic layers during photographing, so that a target object may be highlighted, and a display effect of the wallpaper may be improved.

According to the first aspect, the obtaining a focusing position in the scene including all the graphic layers includes: obtaining an object in a top graphic layer; detecting whether the object in the top graphic layer is complete; dividing, if detecting that the object in the top graphic layer is complete, the object in the top graphic layer into n photographing regions at equal proportions in a first direction; and obtaining a center position of a first photographing region as the focusing position, where the first photographing region is a first photographing region or an $n^{th}$ photographing region in the first direction, and n is an integer greater than 1. In this way, if detecting that the object in the top graphic layer is complete, the mobile phone may divide the target object into n regions in the first direction, where n is 2, 3, or the like. The focusing position is the first photographing region or the $n^{th}$ photographing region, for example, the head of the target object, so that the target object may be highlighted when the focusing position is at the head of the target object.

According to the first aspect, the method further includes: dividing, if detecting that the object in the top graphic layer is not complete, the object in the top graphic layer into m photographing regions at equal proportions in the first direction; and obtaining a center position of a second photographing region as the focusing position, where the second photographing region is a first photographing region or an $m^{th}$ photographing region in the first direction, and 1<m≤n and m is an integer. In this way, when the target object is not complete, a quantity of regions into which the target object is divided is less than a quantity of divided regions when the target object is complete, thereby preventing a problem that the target object cannot be highlighted.

According to the first aspect, the detecting whether the object in the top graphic layer is complete includes: detecting whether a target object in an image corresponding to the top graphic layer includes a horizontal/vertical cropping tangent line; determining that the object in the top graphic layer is not complete if the horizontal/vertical cropping tangent line is detected; and determining that the object in the top graphic layer is complete if no horizontal cropping tangent line is detected and no vertical cropping tangent line is detected. In this way, the electronic device may quickly determine whether the target object is complete by detecting whether the horizontal/vertical cropping tangent line is included, and a detection speed is high and detection is accurate.

According to the first aspect, the preset interface includes: a lock screen interface, a main screen interface, and an icon editing interface; and the lock screen interface matches a first photographing angle, the main screen interface matches a second photographing angle, and the icon editing interface matches third photographing angle, where a photographing distance of the first photographing angle is greater than a photographing distance of the second photographing angle, and a photographing distance of the third photographing angle is greater than the photographing distance of the second photographing angle and less than the photographing distance of the first photographing angle; a photographing height of the third photographing angle is greater than a photographing height of the second photographing angle and less than a photographing height of the first photographing angle; and a photographing direction of the first photographing angle, a photographing direction of the second photographing angle, and a photographing direction of the third photographing angle are the same. In this way, a photographing distance of the lock screen interface is farthest, and a photographing distance of the main screen interface is nearest, so that when the lock screen interface is switched to the main screen interface, the target video may present a visual effect from far to near, and the user obtains a visual experience of zooming in the target object, thereby enhancing the interactivity of the wallpaper.

According to the first aspect, the preset interface further includes: at least one menu interface, where the menu interface is an interface other than the main screen interface in a system desktop; the menu interface matches a fourth photographing angle; and a photographing direction of the fourth photographing angle is different from the photographing direction of the second photographing angle, a photographing height of the fourth photographing angle is the same as the photographing height of the second photographing angle, and a photographing distance of the fourth photographing angle is the same as the photographing distance of the second photographing angle. In this way, when the main screen interface is switched to the menu interface, due to different photographing directions, the target video may present an effect of changes from different viewing angles.

According to the first aspect, before the obtaining, in response to an interface switching operation, a target video of changing from a scene image of a current preset interface to a scene image of a next preset interface, the method further includes: obtaining, in response to a second select operation of the user, an image corresponding to a background graphic layer of each menu interface and an image corresponding to a background graphic layer of the main screen interface from a gallery, where the image corresponding to the background graphic layer of the main screen interface is different from the image corresponding to the background graphic layer of the menu interface. In this way, the user may set a corresponding background image for each preset scene, so that the background image is updated during interface switching, thereby further improving the display interestingness of the wallpaper and improving the interactivity between the wallpaper and the user.

According to the first aspect, the graphic layer includes a target graphic layer and a background graphic layer; and there is at least one target graphic layer, and there is at least one background graphic layer. In this way, there are a plurality of background graphic layers and there are a plurality of target graphic layers, so that the image corresponding to each graphic layer may be edited more flexibly. Therefore, objects in different graphic layers may be combined flexibly to generate different scenes, so that the target video further meets the requirement of the user.

According to the first aspect, before the adjusting a position and a size of the image respectively corresponding to each graphic layer, the method further includes: obtaining a graphic layer including the target object as the target graphic layer; cropping an image corresponding to the target graphic layer based on a contour of the target object, to obtain the target object in the target graphic layer; and updating the image corresponding to the target graphic layer as the target object in the target graphic layer. In this way, the electronic device crops the target object, and interference from a background in the image corresponding to the target graphic layer to the target object may be prevented.

According to the first aspect, the preset interface includes: a lock screen interface, a main screen interface, and an icon editing interface; and the generating the target video based on the scene image corresponding to the next preset interface and the scene image corresponding to the current preset interface includes: obtaining, if detecting that the current preset interface is the lock screen interface and the next preset interface is the main screen interface, a scene image corresponding to the icon editing interface; and generating, based on a scene image of the lock screen interface, the scene image corresponding to the icon editing interface, and a scene image of the main screen interface, a target video of gradually changing from the scene image of the lock screen interface to the scene image of the main screen interface. In this way, the electronic device generates the target video based on a plurality of scene images, so that the target video may apparently present a dynamic effect.

According to the first aspect, the interface switching operation includes: a screen unlock operation, and a leftward slide/rightward slide operation in a screen-on state.

According to the first aspect, the image includes a two-dimensional image or a three-dimensional image. In this way, the three-dimensional image may further enhance the dynamic effect of the target video, and the two-dimensional image may be an image photographed by the user, so that wallpaper editing is more flexible.

According to a second aspect, this application provides a wallpaper display method, including: obtaining, in response to a second select operation of a user, an image corresponding to a background graphic layer of each menu interface and an image corresponding to a background graphic layer of a main screen interface from a gallery, where the image corresponding to the background graphic layer of the main screen interface is different from the image corresponding to the background graphic layer of the menu interface, and both the menu interface and the main screen interface belong to desktops; adjusting a position and a size of an image respectively corresponding to each graphic layer; obtaining, in response to a desktop switching operation, a scene image of a next to-be-displayed interface, where the scene image of the next to-be-displayed interface is obtained by a virtual camera by photographing a scene including all graphic layers based on a photographing angle corresponding to the next to-be-displayed interface, and the desktop switching operation is used for indicating switching between adjacent desktops; and using the scene image corresponding to the next to-be-displayed interface as a wallpaper, and displaying the wallpaper.

In this way, an electronic device obtains different background images for each menu interface and the main screen interface, so that during desktop switching, the scene image corresponding to the next to-be-displayed interface may be obtained as the wallpaper and the wallpaper is displayed. Since a background image of each interface in a desktop is different and corresponds to the desktop switching operation performed by the user, a background in the scene image may be quickly switched, so that a background of a target object is quickly changed, thereby improving interaction experience with the user during desktop switching, and enhancing the display interestingness of the wallpaper. In addition, the background image of each interface in the desktop may be customized by the user, and the display wallpaper further meets a requirement of the user.

According to a third aspect, this application provides an electronic device, including: one or more processors; a memory; and one or more computer programs, where the one or more computer programs are stored on the memory, and when the computer programs are executed by the one or more processors, the electronic device is caused to perform the wallpaper display method according to the first aspect and any implementation of the first aspect or perform the wallpaper display method according to the second aspect.

The third aspect corresponds to the first aspect and any implementation of the first aspect. For technical effects corresponding to implementations of the third aspect, reference may be made to the technical effects corresponding to the foregoing first aspect and any implementation of the first aspect. Details are not described herein again.

According to a fourth aspect, this application provides a computer-readable medium configured to store a computer program, where when the computer program is run on an electronic device, the electronic device is caused to perform the wallpaper display method according to the first aspect and any implementation of the first aspect or perform the wallpaper display method according to the second aspect.

BRIEF DESCRIPTION OF DRAWINGS

To describe the technical solutions in embodiments of this application more clearly, the following briefly describes the accompanying drawings required for describing the embodiments of this application. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1A:
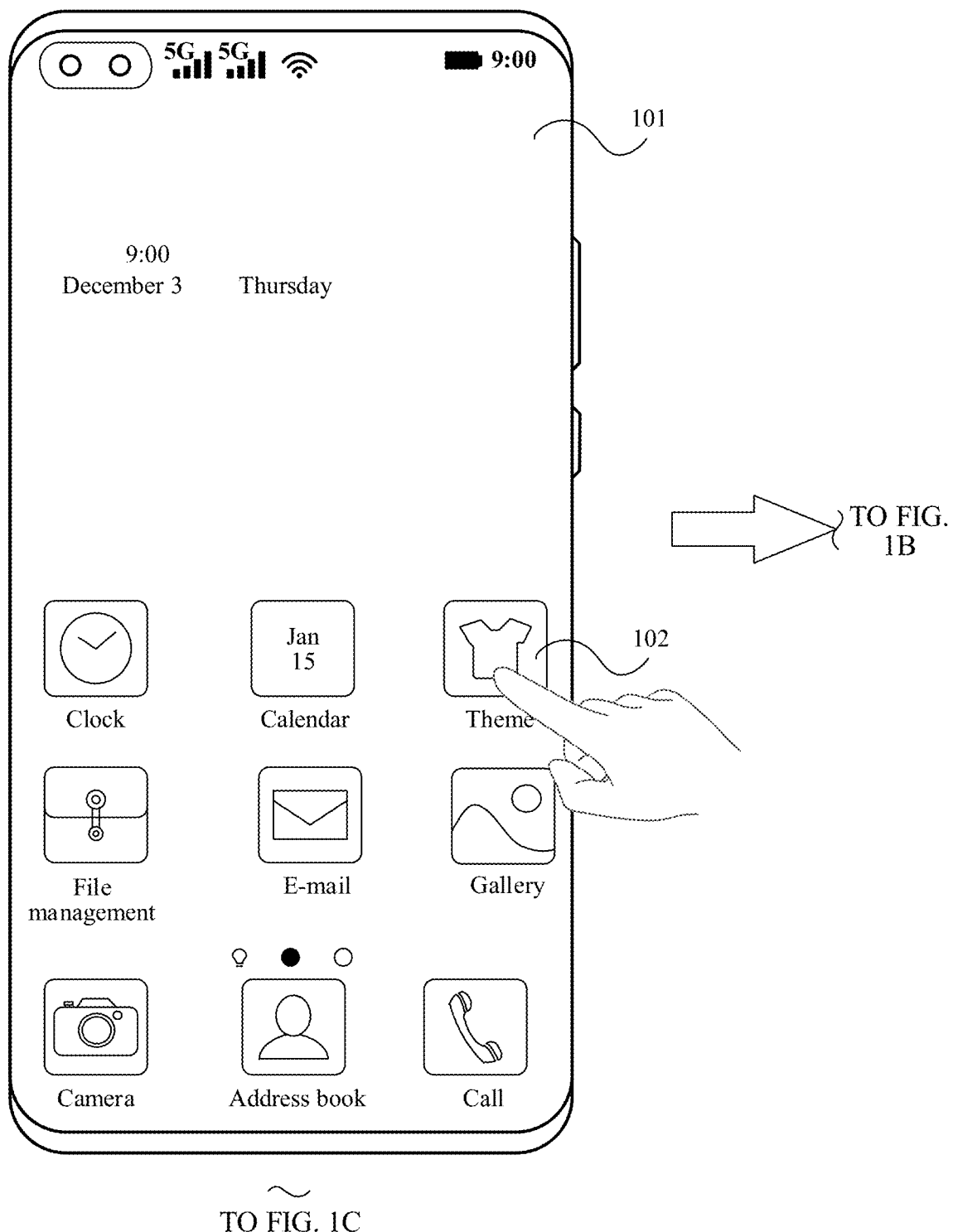
FIG. 1A to FIG. 1D exemplarily show a schematic diagram of a static wallpaper display scenario.

The following clearly and comprehensively describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

The term "and/or" in this specification is only an association relationship for describing associated objects, and represents that three relationships may exist, for example, A and/or B may represent the following three cases: Only A exists, both A and B exist, and only B exists.

In the specification and claims in the embodiments of this application, the terms "first", "second", and the like are intended to distinguish between different objects but do not indicate a particular sequence of the objects. For example, a first target object and a second target object are intended to distinguish between different target objects, but do not indicate a particular sequence of the target objects.

In the embodiments of this application, the term "exemplary" or "for example" is used to represent giving an example, an illustration, or a description. Any embodiment or design scheme described by using "exemplary" or "for example" in the embodiments of this application should not be explained as being more preferred or having more advantages than another embodiment or design scheme. Exactly, the term such as "exemplary" or "for example" as used herein is intended to present a related concept in a specific manner.

In the description of the embodiments of this application, unless otherwise stated, "a plurality of" means two or more. For example, a plurality of processing units refer to two or more processing units; and a plurality of systems refer to two or more systems.

In some embodiments, an electronic device including a display screen is generally provided with a wallpaper, and the electronic device is, for example, a mobile phone, a smartwatch, or a smart band. In this example, a description is made by using an example in which the electronic device is a mobile phone. A wallpaper is generally displayed on a display screen of the mobile phone, the wallpaper generally includes a dynamic wallpaper and a static wallpaper, and the dynamic wallpaper is a video manufactured by a provider (for example, a theme application) in advance. A user may select the manufactured dynamic wallpaper through the theme application, and applies the dynamic wallpaper to wallpaper display of an interface. Although the dynamic wallpaper is a dynamic video, the dynamic wallpaper may be applied to a lock screen interface, a desktop, and other menu interfaces. However, in a process that the user indicates the mobile phone to switch from the lock screen interface to the desktop, a spatial effect and a depth effect of interface switching are not provided, and interaction experience between the wallpaper and the user is reduced consequently. In addition, the dynamic wallpaper cannot be customized by the user, and an interaction effect between the wallpaper and the user is further reduced.

The static wallpaper is a two-dimensional image, and since the static wallpaper is a two-dimensional image, the user may select a customized image as a wallpaper of the lock screen interface and a wallpaper of the desktop and display the wallpaper through the display screen. However, the two-dimensional image does not include a spatial effect, leading to a weak interaction effect between the user and the wallpaper. FIG. 1A to FIG. 1D exemplarily show a schematic diagram of a static wallpaper display scenario.

Figure 1B:
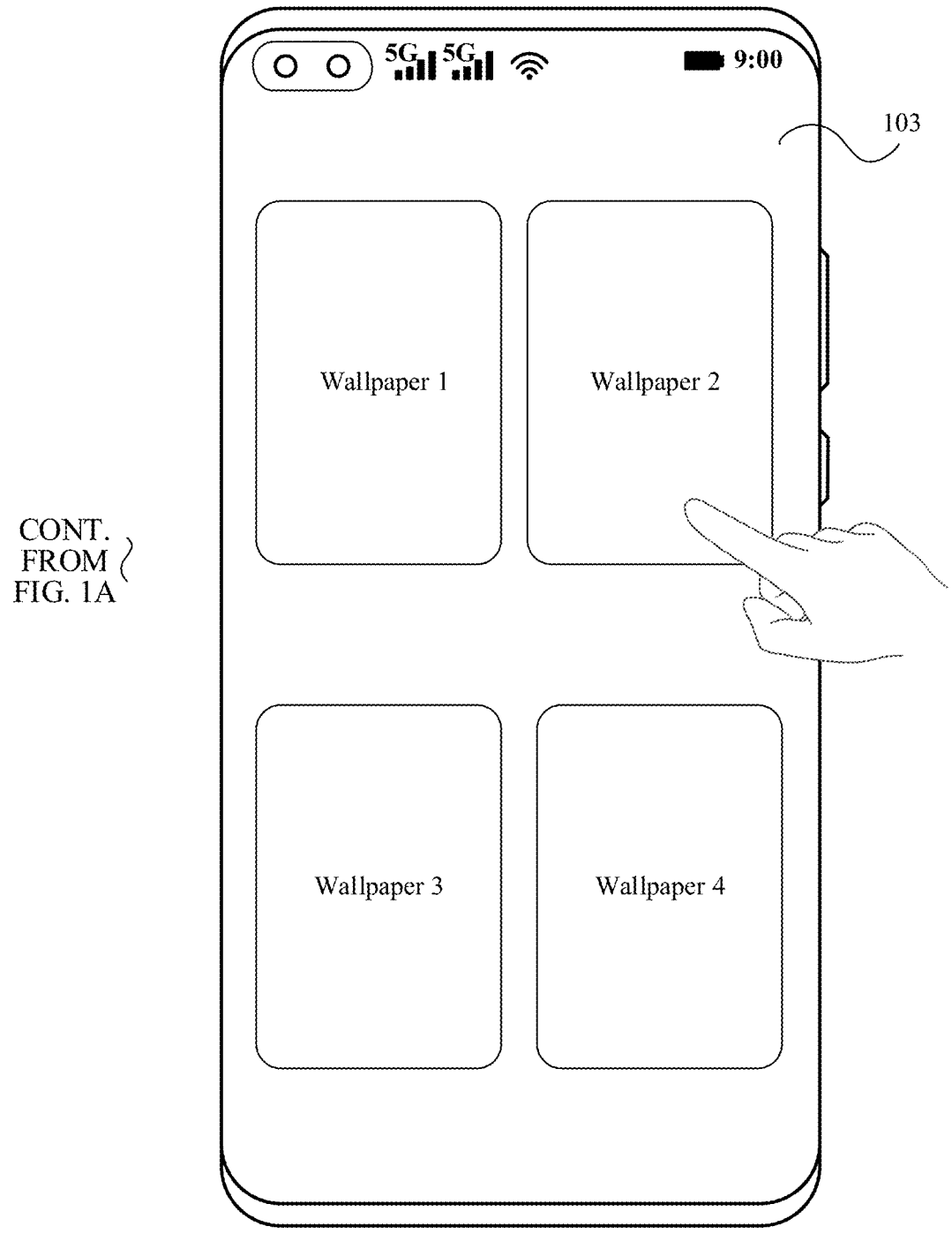
Figure 1C:
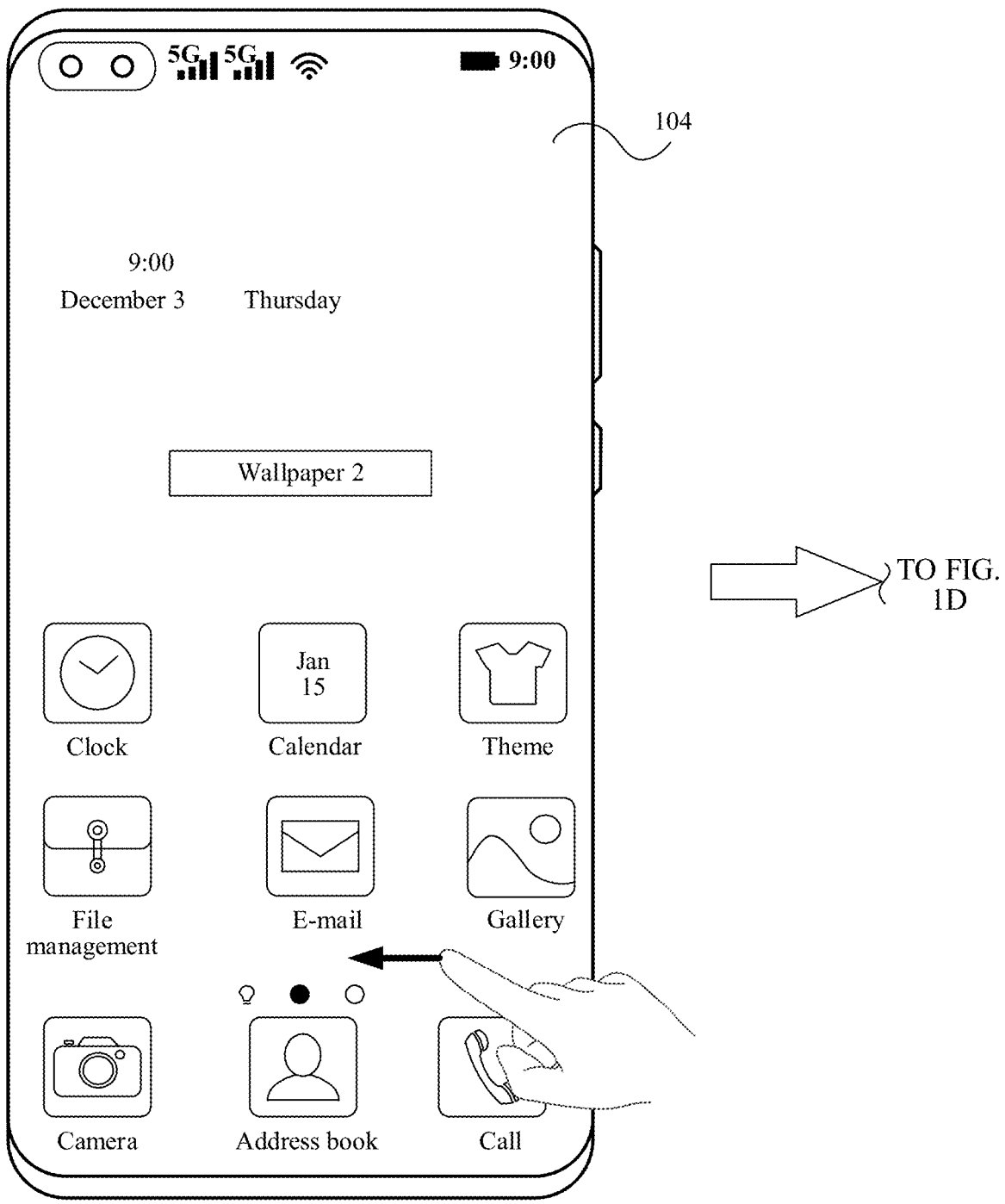
Figure 1D:
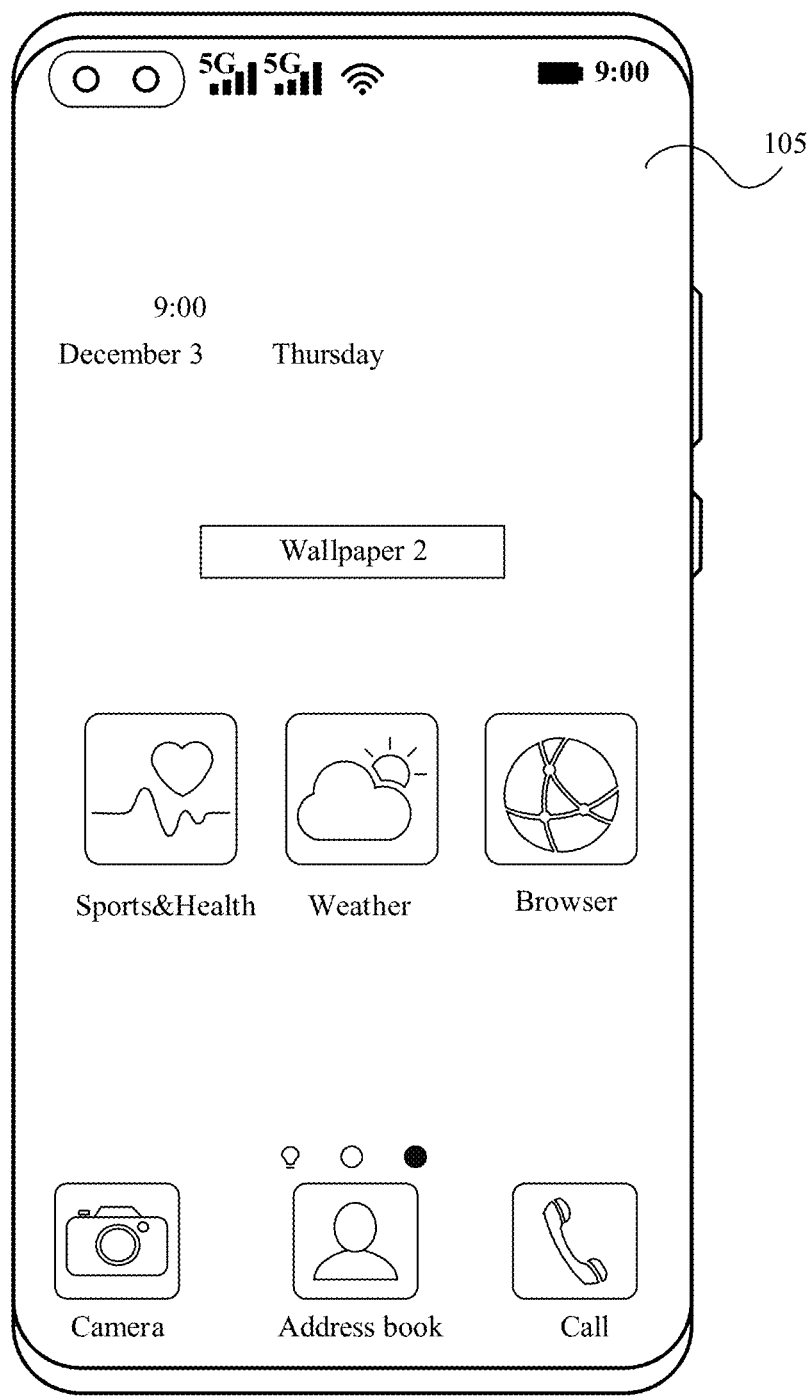

As shown in FIG. 1A, the desktop of the mobile phone includes a main screen interface and a menu interface, and the user taps an icon 102 of a theme application in a main screen interface 101 to enter a theme application interface 103. As shown in FIG. 1B, the theme application interface 103 may include a plurality of different wallpapers, for example, dynamic wallpapers and static wallpapers, and in this example, the theme application interface 103 displays four wallpapers. Optionally, the wallpaper 1 to the wallpaper 4 are all static wallpapers. In response to an operation that the user selects the wallpaper 2, the mobile phone applies the wallpaper 2 to the desktop of the mobile phone. As shown in FIG. 1C and FIG. 1B, the mobile phone returns to the main screen interface, and a wallpaper of a main screen interface 104 is changed to the wallpaper 2. As shown in FIG. 1C, the user slides leftward on a screen, to switch from the main screen interface 104 to a menu interface 105, and as shown in FIG. 1D, a wallpaper of the menu interface 105 is still the wallpaper 2. That is, the static wallpaper does not change along with the slide operation of the user, and no interaction effect is generated with the slide operation of the user. As a result, use experience of the user is reduced.

An embodiment of this application provides a wallpaper display method. The electronic device supports the user in selecting an image from a gallery as a wallpaper, and during interface switching, the wallpaper presents a space change effect, thereby enhancing an interaction effect between the electronic device and the user.

Figure 2:
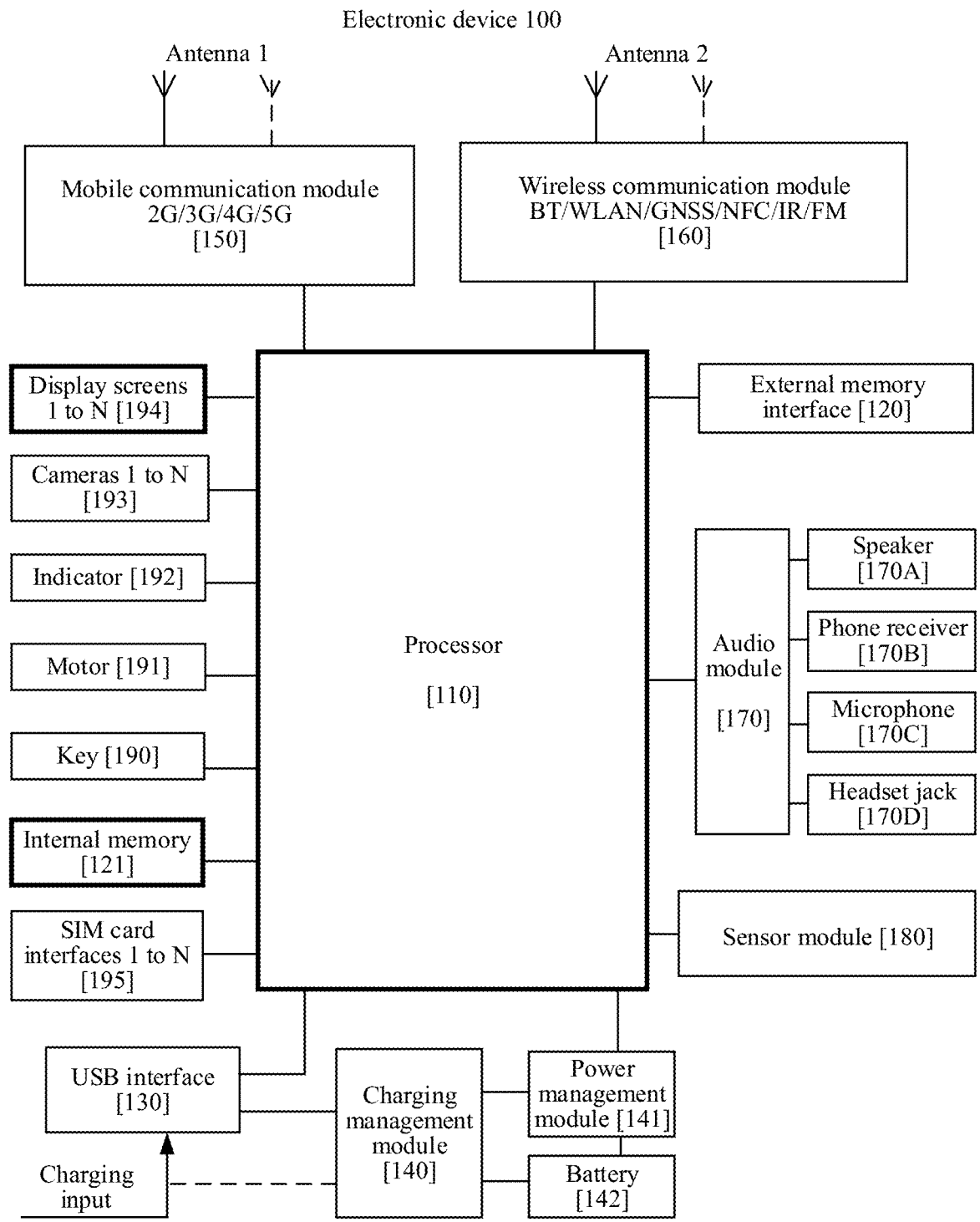
FIG. 2 exemplarily shows a schematic diagram of a structure of an electronic device.

FIG. 2 is a schematic diagram of a structure of an electronic device 100 according to an embodiment of this application. It should be understood that, the electronic device 100 shown in FIG. 2 is only an example of the electronic device, and the electronic device 100 may include more or fewer components than those shown in the figure, or may combine two or more components, or may have a different component configuration. The components shown in FIG. 1A to FIG. 1D may be implemented by hardware that includes one or more signal processors and/or application-specific integrated circuits, software, or a combination of hardware and software.

The electronic device 100 may include: a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

Figure 3:
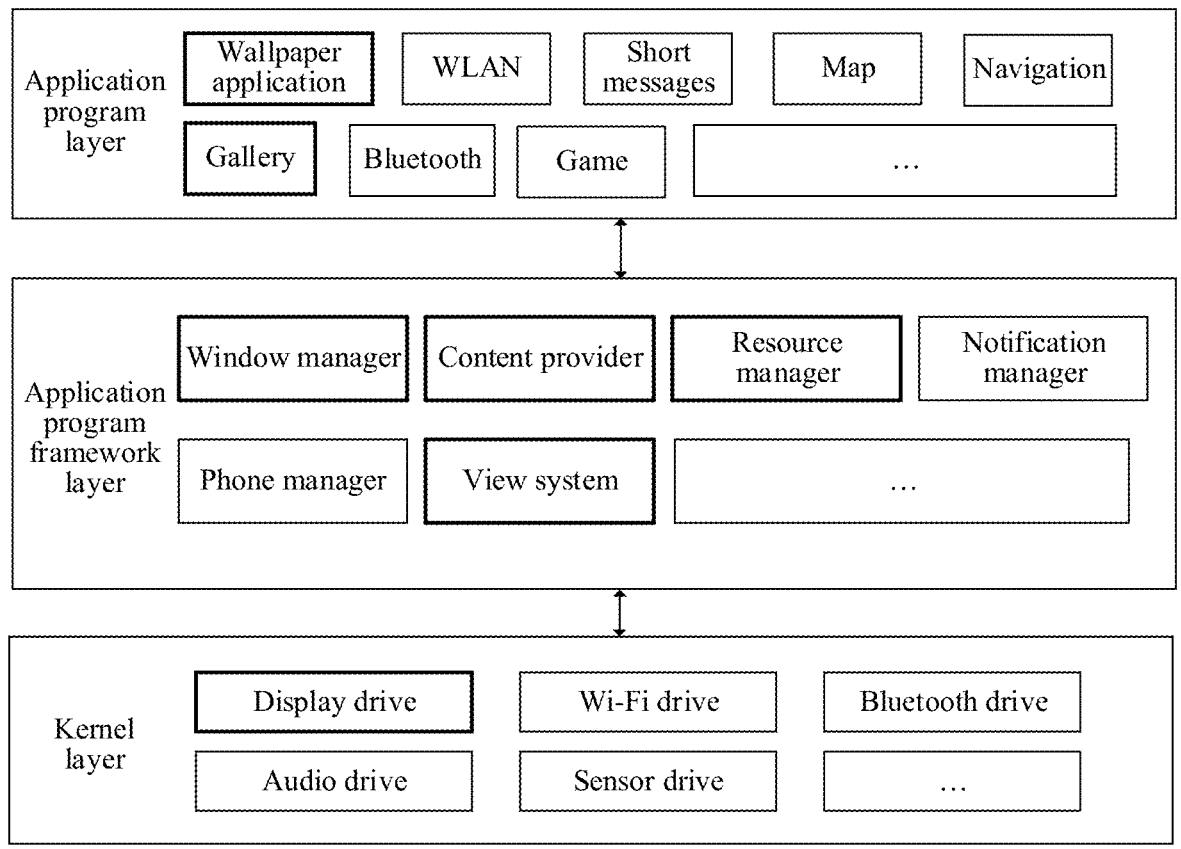
FIG. 3 exemplarily shows a schematic diagram of a software structure of an electronic device.

FIG. 3 is a block diagram of a software structure of the electronic device 100 according to an embodiment of this application.

In a layered architecture of the electronic device 100, software is divided into several layers, and each layer has a clear role and task. The layers communicate with each other through a software interface. In some embodiments, an Android system is divided into three layers that are respectively an application program layer, an application program framework layer, and a kernel layer from top to bottom. It may be understood that, the layers and components included in the layers in the software structure of FIG. 3 do not constitute a specific limitation to the electronic device 100. In some other embodiments of this application, the electronic device 100 may include more or fewer layers than those shown in the figure, and each layer may include more or fewer components. This is not limited in this application.

As shown in FIG. 3, the application program layer may include a series of application packages. The application packages may include application programs such as wallpaper application, WLAN, Bluetooth, music, game, short messages, gallery, call, navigation, and the like. The wallpaper application may invoke an interface of the gallery to read pictures in the gallery, and the wallpaper application may also invoke a camera to obtain images photographed by the camera.

The application program framework layer provides an application programming interface (application programming interface, API) and a programming framework for application programs at the application program layer. The application program framework layer includes some predefined functions.

As shown in FIG. 3, the application program framework layer may include a window manager, a resource manager, a content provider, a view system, a phone manager, a notification manager, and the like.

The window manager is configured to manage a window program. The window manager may obtain a size of a display screen, determine whether there is a status bar, lock the screen, capture the screen, and the like.

The resource manager provides various resources such as a localized character string, an icon, a picture, a layout file, and a video file for an application program.

The content provider is configured to store and obtain data and enable the data accessible to an application program. The data may include a video, an image, an audio, calls made and answered, a browsing history and bookmarks, an address book, and the like.

The view system includes visual controls such as a control for displaying a text and a control for display a picture. The view system may be configured to construct an application program. A display interface may include one or more views. For example, a display interface including a short message notification icon may include a view for displaying a text and a view for displaying a picture.

The phone manager is configured to provide a communication function for the electronic device 100, for example, call status management (including connected and hang-up).

The notification manager enables an application program to display notification information in the status bar that may be used to convey a message of a notification type, where the message may disappear automatically after a short stay without user interaction. For example, the notification manager is configured to provide a notification of download completion, a message notification, and the like. The notification manager may alternatively be a notification that appears on a top status bar of a system in the form of a graph or a scroll bar text, for example, a notification of an application program running on the background, or may be a notification that appears on a screen in the form of a dialog window. For example, text information is prompted in the status bar, a prompt tone is produced, the electronic device vibrates, or an indicator light blinks.

The kernel layer is a layer between hardware and software. The kernel layer includes at least a display drive, a camera drive, an audio drive, and a sensor drive.

It may be understood that, the layers and components included in the layers in the software structure shown in FIG. 3 do not constitute a specific limitation to the electronic device 100. In some other embodiments of this application, the electronic device 100 may include more or fewer layers than those shown in the figure, and each layer may include more or fewer components. This is not limited in this application.

Figure 4:
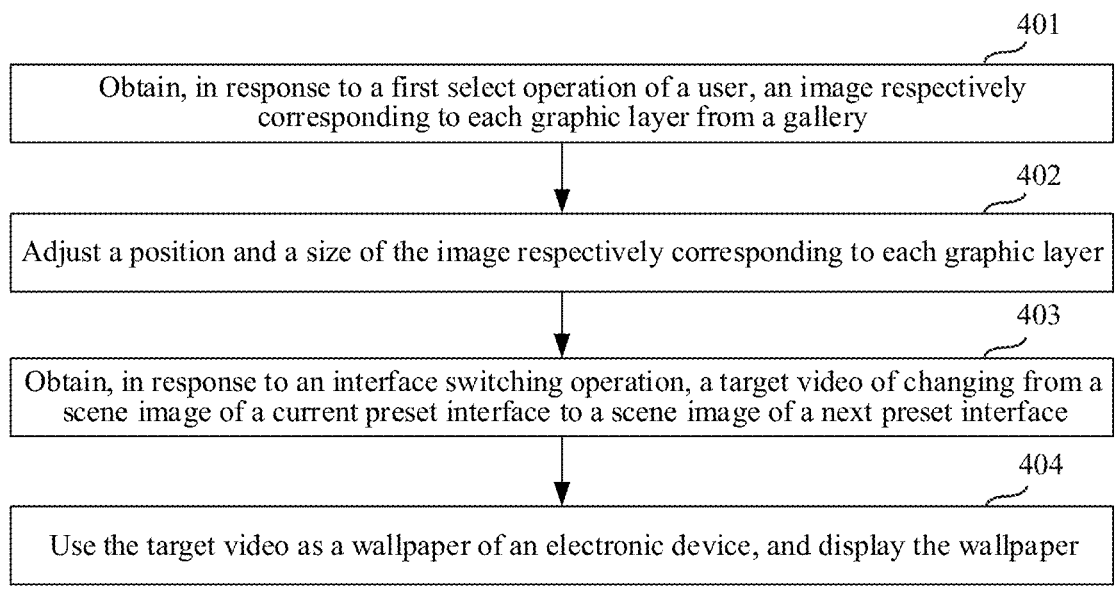
FIG. 4 exemplarily shows a flowchart of wallpaper display.

FIG. 4 exemplarily shows a flowchart of wallpaper display. In this example, a description is made by using an example in which the electronic device is a mobile phone, and the wallpaper display method includes the following steps.

Step 401: The mobile phone obtains, in response to a first select operation of a user, an image respectively corresponding to each graphic layer from a gallery, where the image corresponding to each graphic layer is different.

For example, the mobile phone starts a theme application in response to an operation that the user starts the theme application (for example, taps an icon of the theme application). The theme application may obtain, in response to the first select operation of the user, images respectively corresponding to different graphic layers, where the image corresponding to each graphic layer is different. The graphic layers in this example are used for manufacturing a wallpaper, that is, the wallpaper includes a plurality of graphic layers.

Optionally, the wallpaper includes at least two graphic layers, which include a target graphic layer and a background graphic layer. The target graphic layer includes a target object, and the target object may be a character, an animal (for example, a cat, a dog, an ostrich, and the like), or a scenery (for example, a bridge, a mountain, a statue, and the like). An image in the background graphic layer is used as a background of the target object. The image in the background graphic layer may include any object, for example, the background image may include a mountain, water, a character, and the like.

Optionally, there is at least one (for example, two or more) target graphic layers, and there is at least one (for example, two or more) background graphic layers. In this example, an example in which there is one target graphic layer and there is one background graphic layer is used.

Optionally, the user selects corresponding images for the target graphic layer and the background graphic layer from the gallery, and the user may select the corresponding images for the target graphic layer and the background graphic layer by directly taking pictures. For example, the mobile phone photographs an image in response to a photographing operation of the user, and use the photographed image as an image corresponding to the target graphic layer or an image corresponding to the background graphic layer.

FIG. 5A to FIG. 5D exemplarily show a schematic diagram of a scenario in which a mobile phone obtains a target graphic layer and a background graphic layer.

Figure 5A:
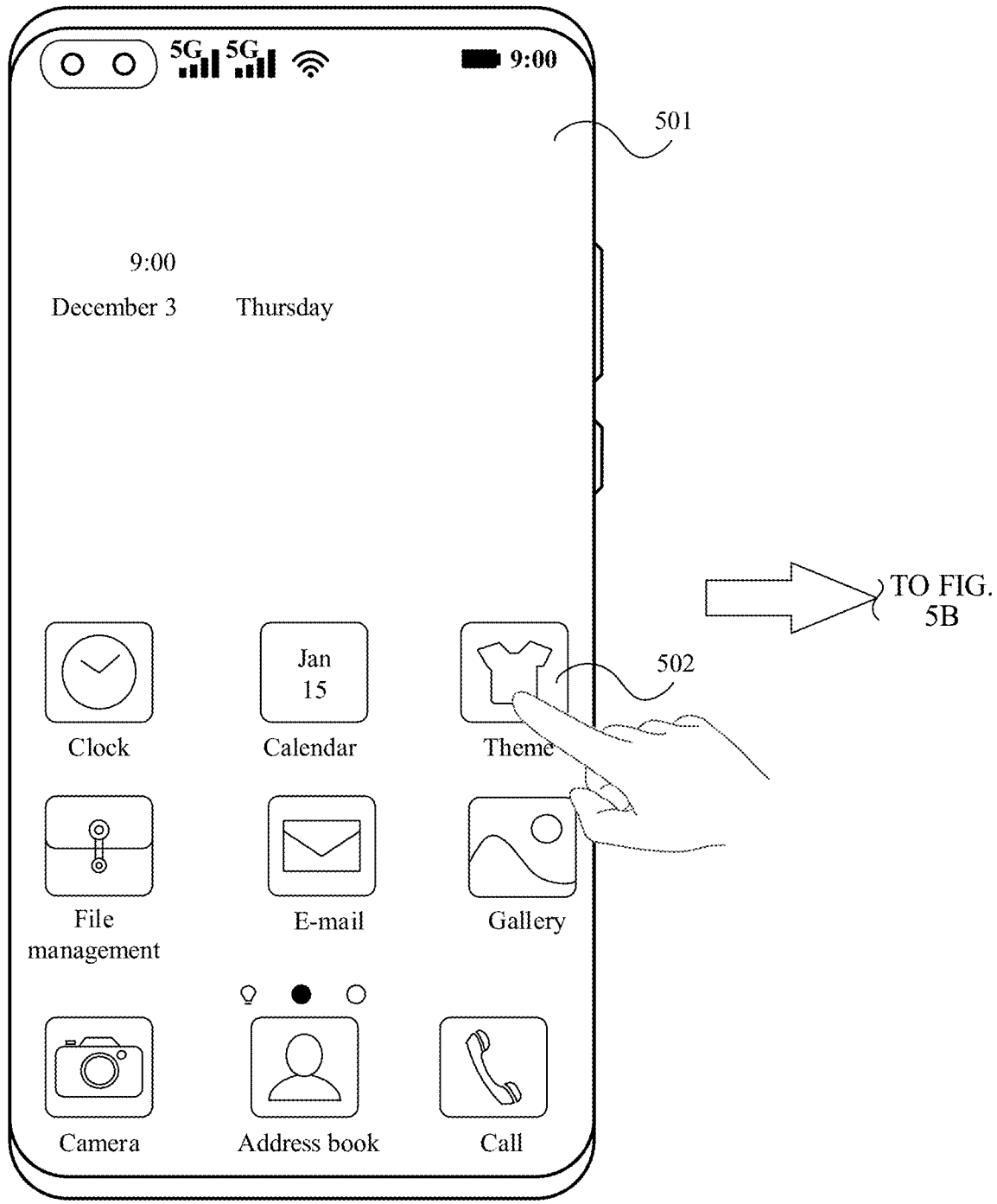
FIG. 5A to FIG. 5D exemplarily show a schematic diagram of a scenario in which a mobile phone obtains a target graphic layer and a background graphic layer.
Figures 5A, 5B:
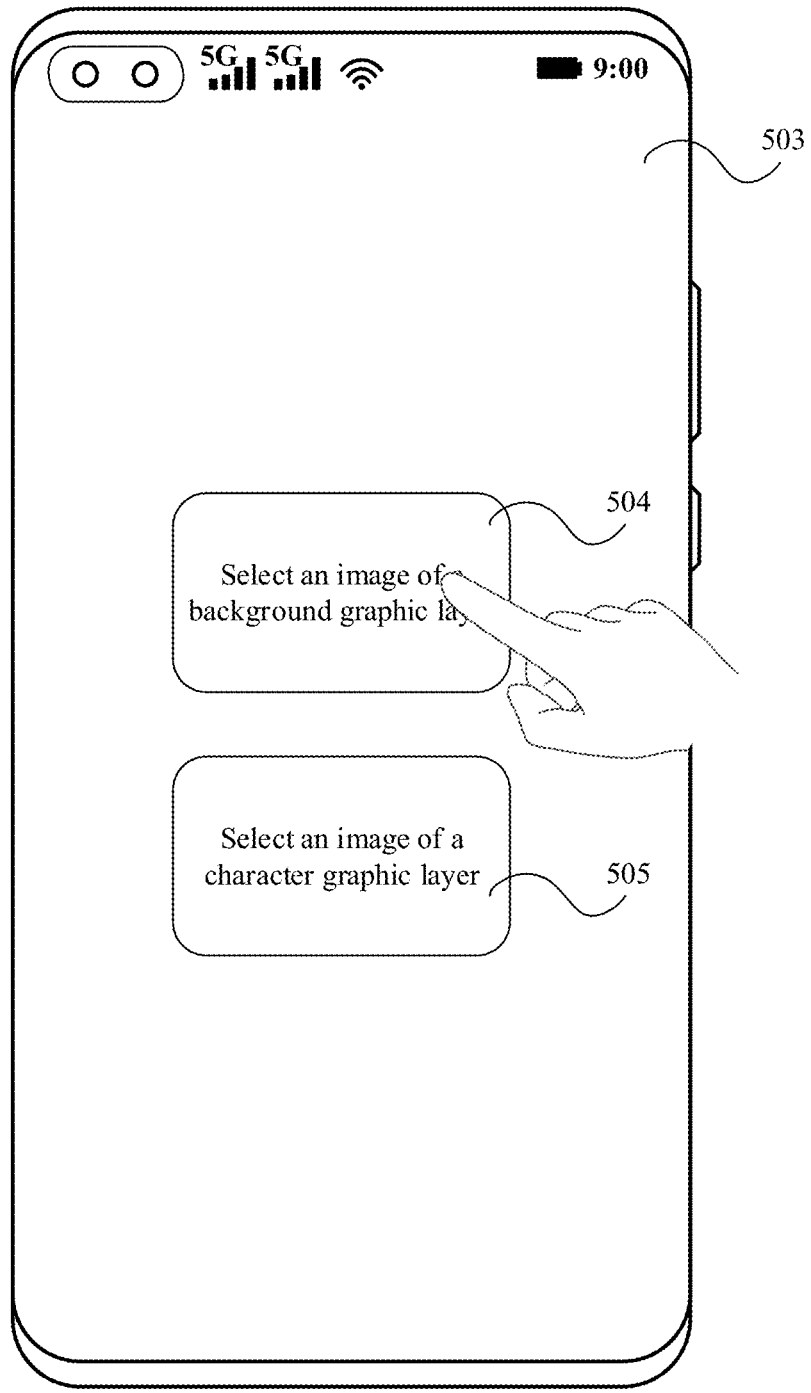
Figure 5C:
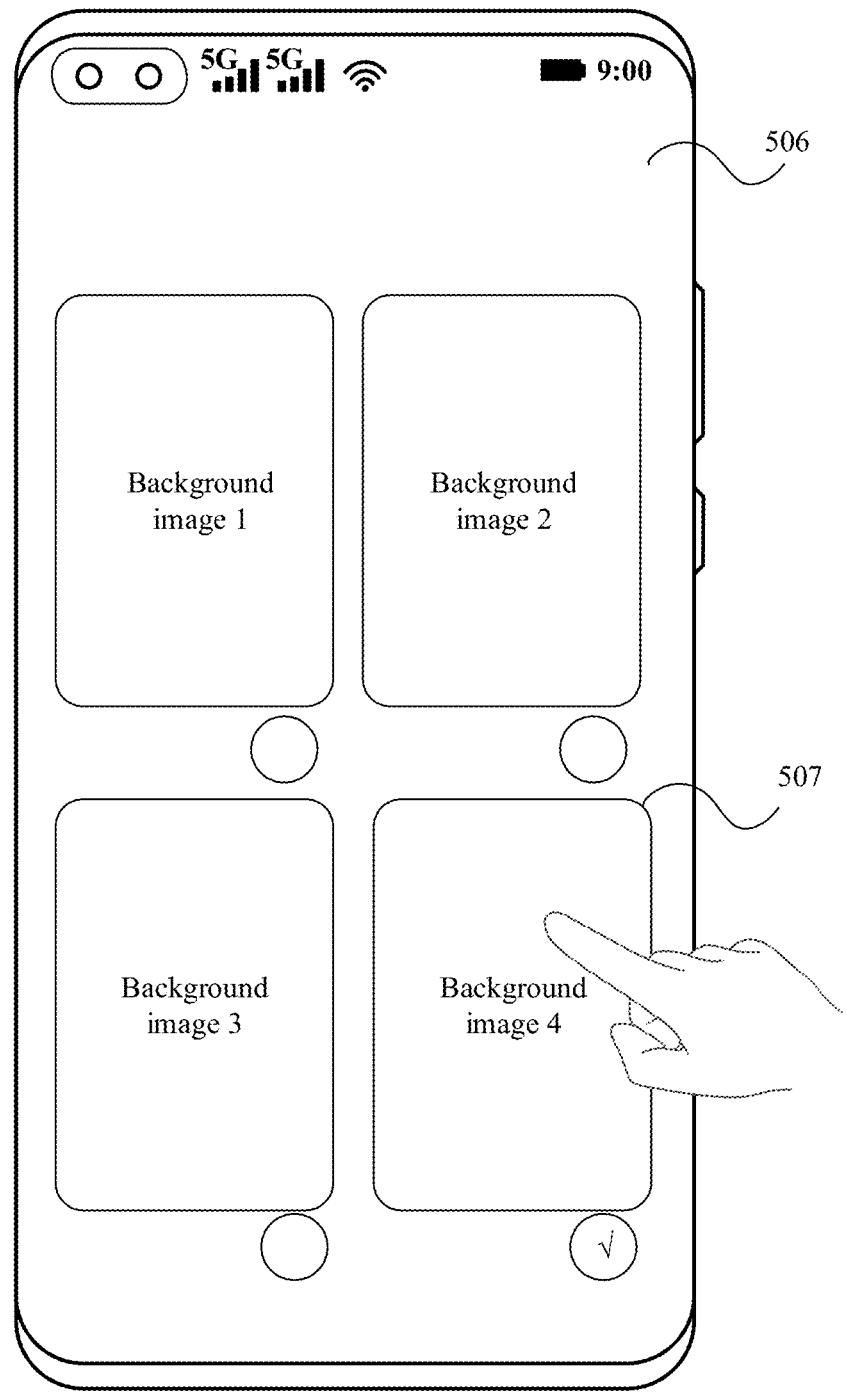
Figure 5D:
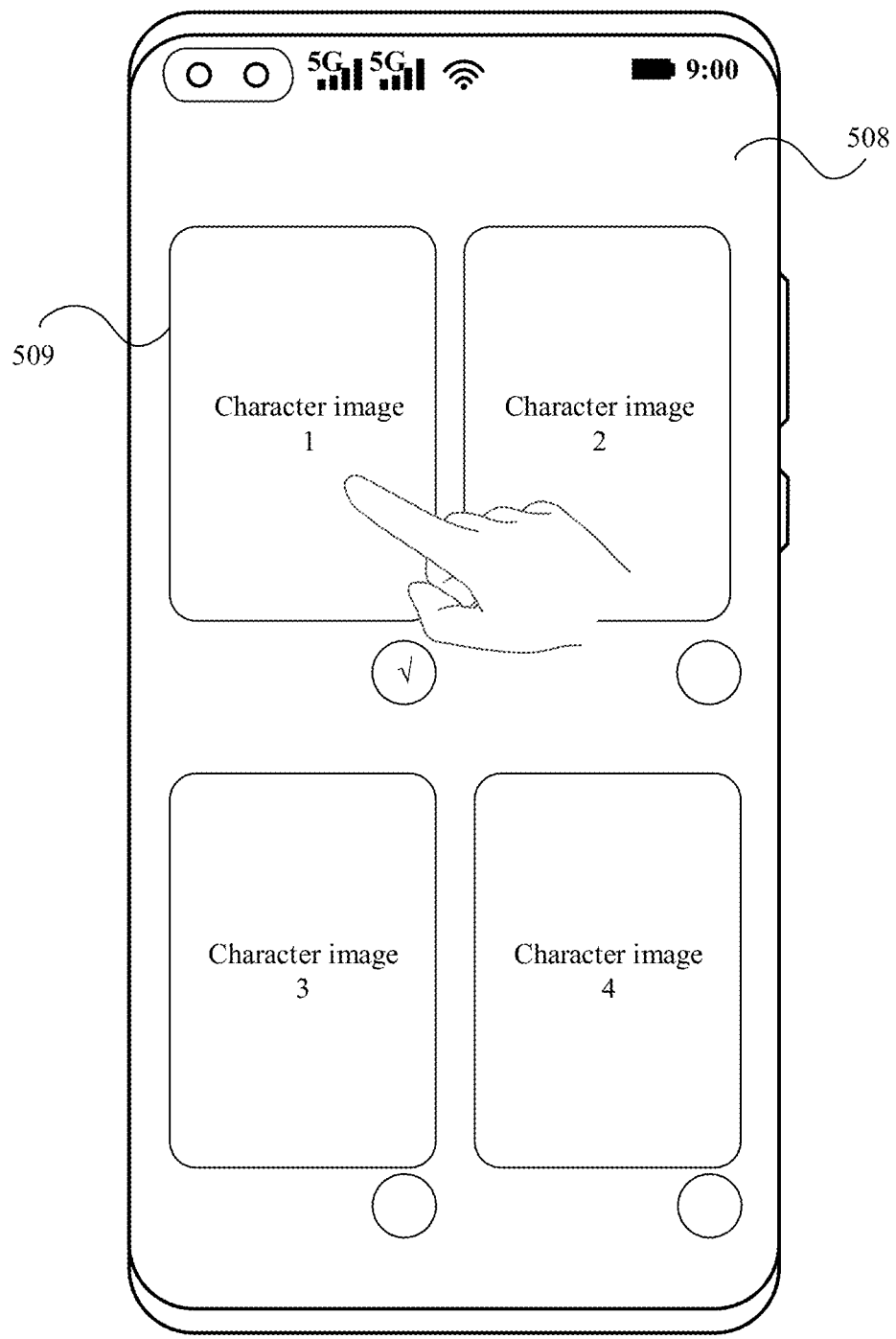

As shown in FIG. 5A, an icon 502 of a theme application is displayed on a main screen interface 501. The user taps the icon 502 of the theme application, and the theme application is started in response to the operation that the user taps the icon 502 of the theme application. A theme application interface 503 includes a control 504 and a control 505, where the control 504 is used for triggering to select an image of the background graphic layer, and the control 505 is used for triggering to select an image corresponding to the target graphic layer (for example, a character graphic layer in this example). As shown in FIG. 5B, the user taps the control 504, and the mobile phone may display a picture source in response to the tap operation of the user, for example, "selected from a gallery" or "obtained through photographing". In this example, an example in which the picture is selected by the user from the gallery is used. The theme application may invoke an image in the gallery. As shown in FIG. 5C, a display screen displays a background image selection interface 506, the background image selection interface 506 may include a background image 1 to a background image 4 that may be selected, the user taps an image 507 and marks that the image 507 is selected below the image, and the theme application uses the image 507 as the image corresponding to the background graphic layer. Similarly, as shown in FIG. 5B, the user selects the control 505 and jumps to a character image selection interface 508, and in response to an operation that the user selects an image 509, the theme application uses the image 509 as the image corresponding to the character graphic layer.

In this example, step 401 may be performed when the mobile phone detects that the user starts the theme application in this application.

Step 402: The mobile phone adjusts a position and a size of the image respectively corresponding to each graphic layer.

For example, after the mobile phone obtains the image respectively corresponding to each graphic layer, the mobile phone may identify a target object in the target graphic layer (for example, the character graphic layer). The mobile phone crops an image corresponding to the target graphic layer based on a contour of the target object, to obtain the target object in the target graphic layer; and updates the image corresponding to the target graphic layer as the target object in the target graphic layer. Optionally, the mobile phone may perform image identification by using an image identification technology, to identify the target object in the image. For example, the mobile phone may identify a human face and an animal face, and further use a character or an animal in the image as the target object.

Figure 6:
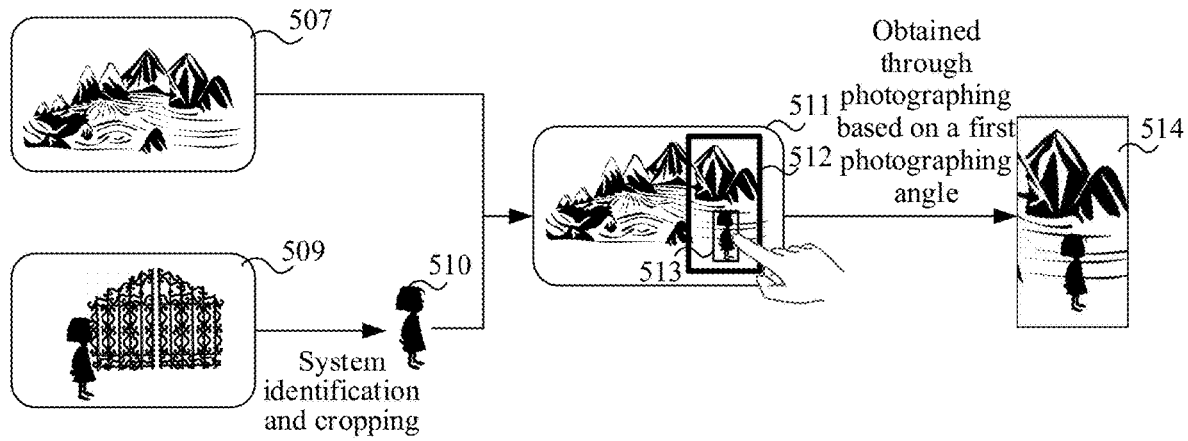
FIG. 6 exemplarily shows a schematic diagram of adjusting a position and a size of an image corresponding to each graphic layer.

FIG. 6 exemplarily shows a schematic diagram of adjusting a position and a size of an image corresponding to each graphic layer.

As shown in FIG. 6, the mobile phone obtains a background image 507 and a character image 509. The mobile phone identifies that the target object is a character by using the image identification technology, and the mobile phone may obtain a contour of a character in the character image 509 and crop the image 509 based on the contour of the character, to obtain a target object 510. The mobile phone may perform cropping to obtain an independent target object based on the contour of the target object, to prevent a background in the image 509 (for example, a gate in the image 509) from affecting the target object. The mobile phone updates the image corresponding to the character graphic layer as an image of the target object (that is, the target object).

Figure 7:
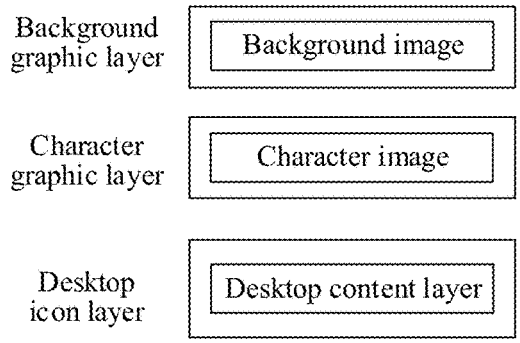
FIG. 7 exemplarily shows a position relationship between a background graphic layer and a character graphic layer.

The mobile phone places a corresponding image based on a position at which each graphic layer is located. Optionally, the background graphic layer is located below the target graphic layer, so that the mobile phone places the image 507 corresponding to the background graphic layer below the target object 510, and the background image 507 and the target object form a to-be-photographed scene. As shown in FIG. 7, FIG. 7 shows a position relationship between a background graphic layer and a character graphic layer. The background graphic layer is located below the character graphic layer, and a desktop icon layer is located above the character graphic layer, so that the desktop icon layer may not be blocked by images in other graphic layers when displayed by a display screen. Similarly, the background graphic layer is placed below the character graphic layer, so that the target object may be prevented from being blocked by an image in the background graphic layer and a display effect is not affected. It should be noted that, the desktop icon layer does not belong to a graphic layer in the wallpaper.

The mobile phone may display a scene including the background image 507 and the target object in an adjustment interface 511. The user may drag the target object, and the mobile phone adjusts a position of the target object in response to the drag operation of the user. Similarly, the user may alternatively drag the background image, and the mobile phone adjusts a position of the background image in response to the drag operation of the user. Optionally, the mobile phone may alternatively change a size (size) of the background image or the target object in response to a size adjustment operation of the user.

In an example, as shown in FIG. 6, the display screen of the mobile phone may display a side frame 512 corresponding to the display screen, and the side frame 512 is used for indicating a size of the display screen. The mobile phone further displays a side frame 513, and the side frame 513 is used for indicating a size of the target object in the display screen. The side frame 513 may be understood as the size of the target object, and the side frame 512 may be understood as the size of the display screen. The size of the display screen cannot be changed, and the user may drag the side frame 512 to determine content in the background image displayed in the display screen. The content displayed in the display screen may be increased by scaling down the size of the background image, and the content displayed in the display screen may be clearer by scaling up the size of the background image. In this example, the side frame 512 is dragged, background content displayed in the display screen is determined in response to the drag operation of the user, and a position of the target object in the display screen is determined in response to an operation that the user drags the side frame 513.

Step 403 may be performed after the mobile phone adjusts the size and the position of the image corresponding to each graphic layer.

Step 403: The mobile phone obtains, in response to an interface switching operation, a target video of changing from a scene image of a current preset interface to a scene image of a next preset interface, where a scene image of each preset interface is obtained by a virtual camera by photographing a scene including all graphic layers based on a photographing angle corresponding to the preset interface.

For example, if the mobile phone detects the interface switching operation, the mobile phone may obtain the scene image of the current preset interface, that is, a scene image of a preset interface before switching, and obtain the scene image of the next preset interface. The preset interface may be a lock screen interface or a desktop, and the desktop includes a main screen interface and a menu interface.

The interface switching operation may include: an operation that a finger of the user slides upward on a screen and an operation that the user long presses a fingerprint sensing region in the screen (for example, long press duration exceeds 2 seconds). Optionally, when the mobile phone detects the upward slide operation of the finger of the user, the mobile phone may obtain the target video, and perform step 404, that is, display the target video.

In an example, when the interface switching operation is detected, the mobile phone may obtain the scene image of the current preset interface and the scene image of the next preset interface. The mobile phone may generate, based on the scene image of the current preset interface and the scene image of the next preset interface, the target video of changing from the scene image of the current preset interface to the scene image of the next preset interface. For a video generation process, reference may be made to an existing manner, and details are not described herein again.

Optionally, before the target video is generated, the mobile phone may further obtain a plurality of images between the scene image of the current interface and the scene image of the next preset interface, and generate the target video based on a preset sequence. Therefore, the target video reflects a process of gradually changing from the scene image of the current preset interface to the scene image of the next preset interface.

In another example, after the position and the size of the image corresponding to each graphic layer is adjusted, the mobile phone may obtain the scene image of each preset interface in advance. The mobile phone generates, based on each preset interface switching relationship and the scene image corresponding to each preset interface, a video matching each interface switching relationship, where the interface switching relationship is used for indicating a correspondence between an interface before switching and an interface after switching. Optionally, the preset interface may include: a main screen interface, a lock screen interface, an icon editing interface, and various menu interfaces. The icon editing interface is used for providing an icon editing function for an application program to the user. The user may perform a long press operation on the main screen interface, the mobile phone displays the icon editing interface in response to the long press operation of the user, and on the icon editing interface, the user touches an icon to drag the icon of the application program, to change a position of the icon of the application program. The user may further perform a delete operation (for example, drag the icon to a position of an icon of a trash bin), to delete the application icon from a desktop icon interface.

The preset interface switching relationship may include: a first switching relationship of switching from the lock screen interface to the main screen interface, a second switching relationship of switching from the lock screen interface to the icon editing interface, a third switching relationship of switching from the main screen interface to the lock screen interface, a fourth switching relationship of switching from the main screen interface to the icon editing interface, a fifth switching relationship of switching from the main screen interface to a menu interface, and a sixth switching relationship of switching between adjacent menu interfaces (for example, switching from a menu interface 1 to a menu interface 2).

The video matching each switching relationship is pre-stored, so that when the interface switching operation is detected, the mobile phone obtains a current interface switching relationship, and obtains, based on the interface switching relationship, a video matching the current interface switching relationship from stored videos as the target video.

A process of obtaining the scene image of each preset interface is described in detail below with reference to the accompanying drawings.

Figure 8:
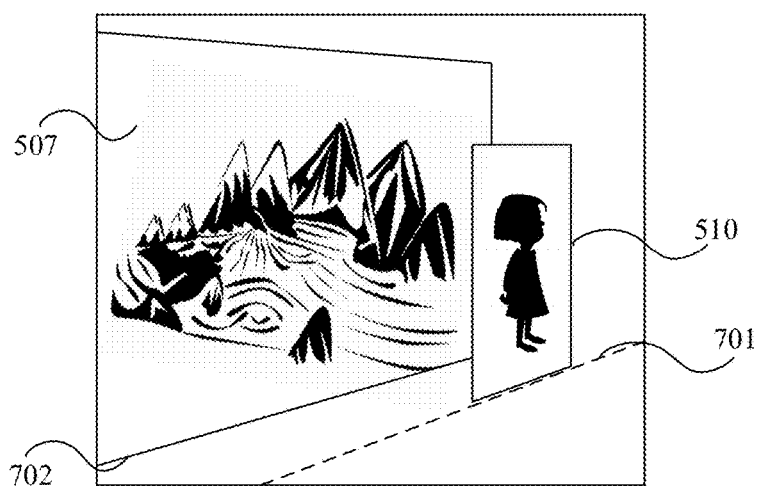
FIG. 8 exemplarily shows a schematic diagram of a background graphic layer and a character graphic layer.

FIG. 8 exemplarily shows a schematic diagram of a background graphic layer and a character graphic layer. As shown in FIG. 8, a background graphic layer 702 is provided, the background 507 is placed on the background graphic layer 702, a character graphic layer 701 is located above the background graphic layer 702, and the target object 510 is placed on the character graphic layer. After the positions and the sizes of the background image and the target object are adjusted, the mobile phone may obtain scene images of different preset interfaces. Optionally, the mobile phone may invoke the virtual camera to photograph scene images in different preset scenarios.

After the size and the position of the image corresponding to each graphic layer are determined, the virtual camera may obtain a photographing angle corresponding to each preset interface. The photographing angle includes: a photographing height, a photographing direction, and a photographing distance. The mobile phone obtains a focusing position of the scene including all the graphic layers, and indicates the virtual camera to focus on the focusing position and photograph the scene including all the graphic layers based on the photographing angle corresponding to the preset interface, to obtain the scene image corresponding to each preset interface.

Optionally, the lock screen interface matches a first photographing angle, the main screen interface matches a second photographing angle, and the icon editing interface matches third photographing angle, where a photographing distance of the first photographing angle is greater than a photographing distance of the second photographing angle, and a photographing distance of the third photographing angle is greater than the photographing distance of the second photographing angle and less than the photographing distance of the first photographing angle; a photographing height of the third photographing angle is greater than a photographing height of the second photographing angle and less than a photographing height of the first photographing angle; and a photographing direction of the first photographing angle, a photographing direction of the second photographing angle, and a photographing direction of the third photographing angle are the same.

Figure 9:
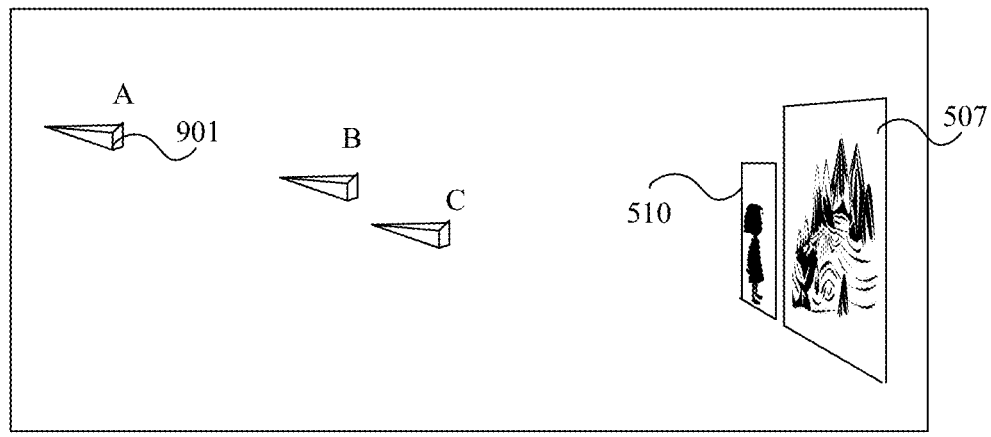
FIG. 9 exemplarily shows a schematic diagram of photographing a scene including all graphic layers based on photographing parameters of objects in different preset interfaces.

For example, FIG. 9 exemplarily shows a schematic diagram of photographing a scene including all graphic layers based on photographing parameters of objects in different preset interfaces.

In this example, the preset interface may include a lock screen interface, an icon editing interface, and a main screen interface. The image 507 is the image corresponding to the background graphic layer, and the target object 510 is the image corresponding to the character graphic layer. After the sizes and the positions of the image 507 and the image 510 are determined, the virtual camera may obtain the photographing angle corresponding to each preset interface. A position A is a photographing position corresponding to the lock screen interface, and the position includes a photographing distance (that is, a distance between the virtual camera and the target object) and a photographing height, where a photographing direction directly faces the target object 510. A position B is a photographing position corresponding to a wallpaper interface, and the position includes a photographing distance (that is, a distance between the virtual camera and the target object) and a photographing height, where a photographing direction directly faces the target object 510. A position C is a photographing position corresponding to the wallpaper interface, and the position includes a photographing distance (that is, a distance between the virtual camera and the target object) and a photographing height, where a photographing direction directly faces the target object 510. In FIG. 9, the photographing distance of the lock screen interface is greater than the photographing distance corresponding to the icon editing interface, and the photographing distance corresponding to the icon editing interface is greater than the photographing distance corresponding to the main screen interface. In addition, the photographing height of the lock screen interface is greater than the photographing height corresponding to the icon editing interface, and the photographing height corresponding to the icon editing interface is greater than the photographing height corresponding to the main screen interface.

The virtual camera needs to photograph the scene including all the graphic layers based on the focusing position and the photographing angle. In this example, the mobile phone may obtain an object in a top graphic layer; detect whether the object in the top graphic layer is complete; divide, if detecting that the object in the top graphic layer is complete, the object in the top graphic layer into n photographing regions at equal proportions in a first direction; and obtain a center position of a first photographing region as the focusing position, where the first photographing region is a first photographing region or an $n^{th}$ photographing region in the first direction, and n is an integer greater than 1. The mobile phone divides, if detecting that the object in the top graphic layer is complete, the object in the top graphic layer into m photographing regions at equal proportions in the first direction; and obtain a center position of a second photographing region as the focusing position, where the second photographing region is a first photographing region or an $m^{th}$ photographing region in the first direction, and 1<m≤n and m is an integer. The first direction may be a direction in which a length of the target object extends. For example, if the target object is a zebra, the first direction is an extending direction from head to tail of the target object; if the target object is a person, the first direction is an extending direction from head to foot; and if the target object is a statue, the first direction is an extending direction from head to foot of the statue.

Specifically, because the target object in the top graphic layer is a photographed target, the mobile phone may detect whether a target object in an image corresponding to the top graphic layer includes a horizontal/vertical cropping tangent line; the mobile phone determines that the object in the top graphic layer is not complete if the horizontal/vertical cropping tangent line is detected; and the mobile phone determines that the object in the top graphic layer is complete if no horizontal cropping tangent line is detected and no vertical cropping tangent line is detected. n may be 3, and m may be 2.

Figure 10:
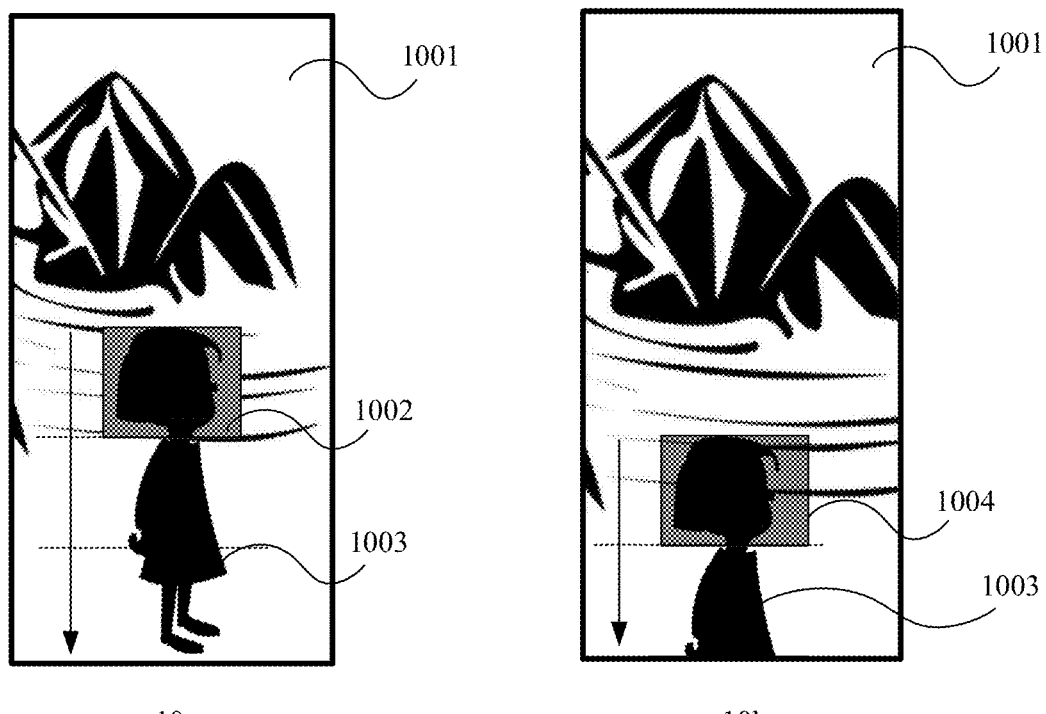
FIG. 10 exemplarily shows a schematic diagram of two focusing positions.

For example, FIG. 10 exemplarily shows a schematic diagram of two focusing positions. FIG. 10 shows a photographing interface photographed by the virtual camera. If detecting that a target object 1003 corresponding to a current top graphic layer does not include a horizontal cropping tangent line and does not include a vertical cropping tangent line, the mobile phone divides the target object 1003 into three equal parts along a first direction, where the first direction is a direction shown by an arrow in 10a, and selects a first photographing region 1002 as the focusing position. If detecting that the target object 1003 corresponding to the current top graphic layer includes a horizontal cropping tangent line, the mobile phone determines that the target object is not complete, divides the target object into two photographing regions along the first direction, and selects a second photographing region 1004 as the focusing position.

After the focusing position and the photographing angle are determined, the mobile phone may photograph the scene including all the graphic layers based on the focusing position and the photographing angle corresponding to the preset interface, to obtain the scene image of the preset interface.

Figure 11:
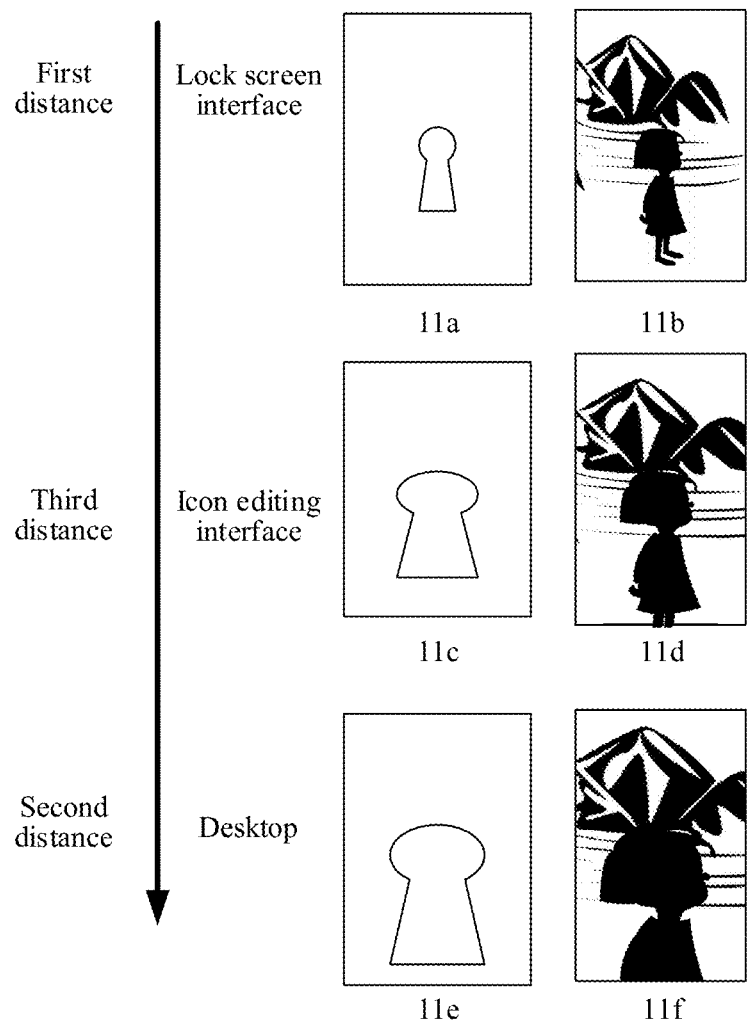
FIG. 11 exemplarily shows a schematic diagram of a scenario after photographing in FIG. 10 is performed.

FIG. 11 exemplarily shows a schematic diagram of a scenario after photographing in FIG. 10 is performed. As shown in FIG. 11, a photographing distance corresponding to the lock screen interface is a first distance, a scene image obtained through photographing is 11b, and 11a is a schematic diagram of a size of the target object in 11b. A scene image corresponding to the icon editing interface is 11d, 11c is a schematic diagram of a size of the target object in 11d, and a photographing distance corresponding to photographing of the scene image 11d is a third distance. A scene image corresponding to the desktop is 11f, 11e is a schematic diagram of a size of the target object in 11f, and a photographing distance corresponding to photographing of the scene image 11f is a second distance. The first distance is greater than the third distance, and the third distance is greater than the second distance. As can be known from FIG. 11, as the photographing distance decreases, the size of the target object gradually increases, and from a same viewing angle, a part of the target object entering the photographing interface gradually decreases.

After the mobile phone obtains the scene image corresponding to each preset interface, if determining that switching is performed from the lock screen interface to the main screen interface in the desktop, the mobile phone may obtain a plurality of images from the first distance to the second distance, and generate a target video of gradually changing from the scene image of the lock screen interface to the scene image of the main screen interface. Optionally, a larger quantity of images included in the target video indicates a better dynamic effect of the target video, and a dynamic effect from far to near of the target object may be apparently represented.

Step 404: Use the target video as a wallpaper of the electronic device, and display the wallpaper.

Figure 12:
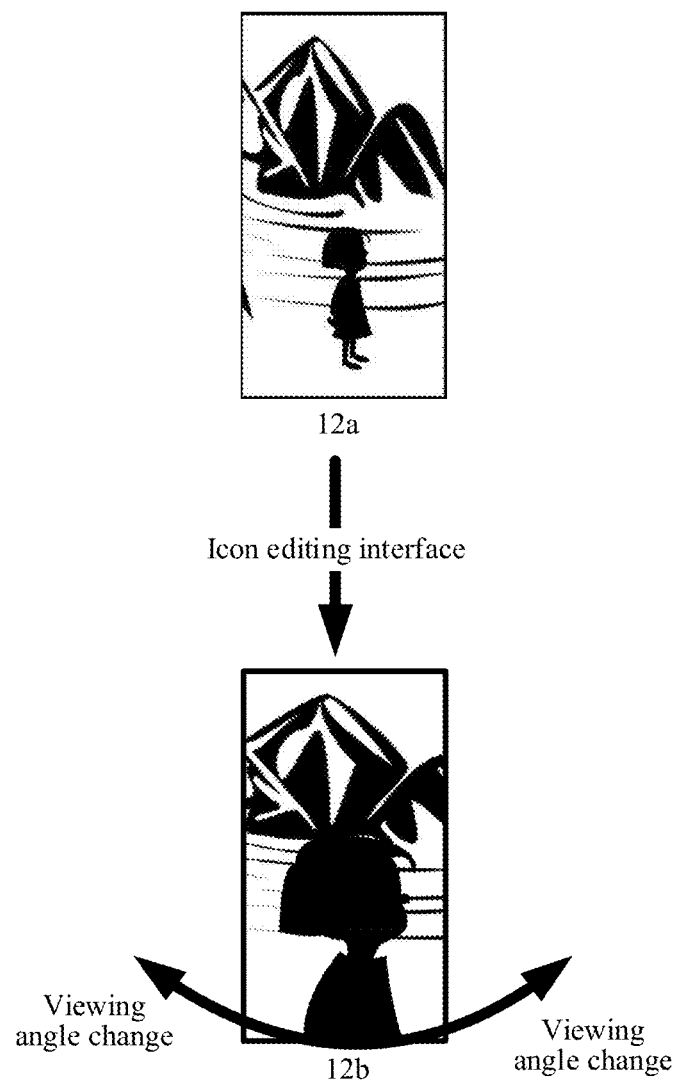
FIG. 12 exemplarily shows a schematic diagram of scene image switching of an electronic device changing from a lock screen interface to a main screen interface.

Specifically, the target video is displayed. As shown in FIG. 12, the scene image corresponding to the lock screen interface is 12a, that is, a wallpaper of the lock screen interface is shown in 12a. The scene image corresponding to the main screen interface is shown in 12b, and the wallpaper shown in 12a is displayed when the user is in the lock screen interface. The user unlocks a screen, and the mobile phone receives an interface switching operation and obtains a target video of gradually changing from 12a to 12b. As shown in FIG. 12, the target video further includes the scene image of the icon editing interface.

It should be noted that, if the mobile phone detects the interface switching operation of the user, the mobile phone obtains the target video and plays the target video. Optionally, the mobile phone may correspondingly play the target video based on a progress of the interface switching operation of the user. For example, the mobile phone currently displays the lock screen interface, and an operation of switching from the lock screen interface to the main screen interface is that the user performs an upward slide operation on the screen by a preset distance (for example, the preset distance is half of a length of a major axis L1 of the screen). When the upward slide operation of the user is detected, the mobile phone obtains the target video and starts to play the target video. When the user slides by ⅓ of L1, the user stops the upward slide operation, and in this case, the mobile phone detects that the interface switching operation is not completed and stops playing the target video. If the mobile phone detects that the finger of the user returns from a current position to an original position, that is, if the mobile phone detects an operation of switching from a current interface to the lock screen interface, the mobile phone may obtain a video of returning from the current interface to the lock screen interface and play the video.

In this example, the mobile phone may control playing of the target video based on the progress of the interface switching operation of the user, so that a playing progress of the target video may follow the interface switching operation of the user. For example, a wallpaper displayed on a display interface is played along with the upward slide operation of the finger of the user, thereby further improving the interactivity between the wallpaper displayed by the electronic device and the user.

In this example, the mobile phone may receive an image in each graphic layer that is customized by the user and adjust a position and a size of the image in each graphic layer, and the mobile phone may automatically generate a target video of switching between interfaces. Since the photographing angle corresponding to each preset interface is different, the scene image corresponding to each preset interface is different, so that the target video may present a dynamic visual effect of changes of the target object during switching between different interfaces, thereby enhancing an interaction effect between the user and the wallpaper.

In some embodiments, the photographing angle further includes a photographing direction, the user may switch from the main screen interface to the menu interface in the desktop through a slide operation, and the mobile phone may obtain a target video of switching from the scene image of the main screen interface to the scene image of the menu interface and display the target video. Photographing directions of scene images between the main screen interface and the menu interface are different, so that the displayed target video may present an effect of changes from different viewing angles.

Figure 13:
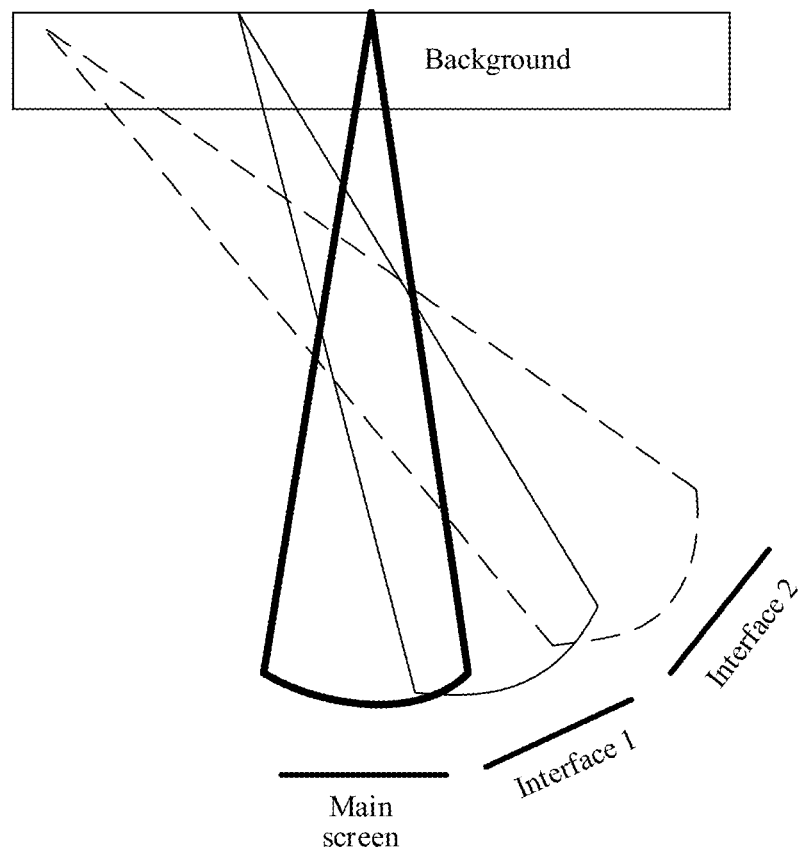
FIG. 13 exemplarily shows a schematic diagram of photographing scene images from different viewing angles.

As shown in FIG. 12, the main screen interface is shown in 12b of FIG. 12, the user may perform a leftward slide operation on a screen or a rightward slide operation on a screen, and the mobile phone switches to display images from different viewing angles in response to the slide operation of the user, so that the wallpaper may present changes from different viewing angles. FIG. 13 is a schematic diagram of photographing scene images from different viewing angles.

As shown in FIG. 13, a photographing direction of the main screen interface is shown by a black bold line in FIG. 13, a photographing direction corresponding to the menu interface 1 in the desktop is shown by a thin solid line in FIG. 13, and a photographing direction corresponding to the menu interface 2 in the desktop is shown by a dashed line in FIG. 13. An angle between the photographing directions of the main screen interface and the menu interface is greater than 0, and if the background image and the target object are two-dimensional images, an angle between the photographing directions of the main screen interface and another menu interface is small and ranges from 0 degree to 30 degrees. If the background image and the target image are three-dimensional images, the angle between the photographing directions of the main screen interface and the another menu interface may range from 0 degree to 360 degrees.

Figure 14:
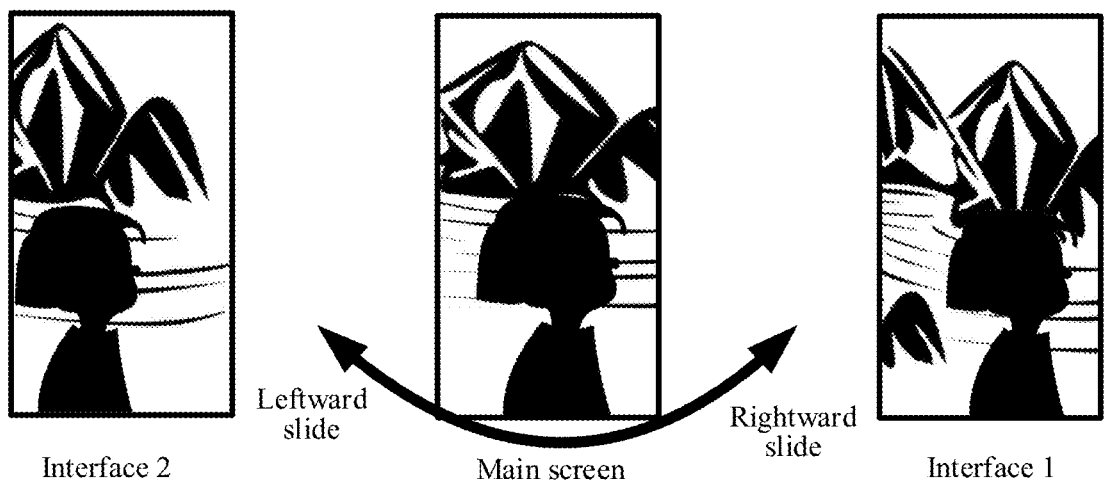
FIG. 14 is a schematic diagram of scene images corresponding to FIG. 13.

FIG. 14 is a schematic diagram of scene images corresponding to FIG. 13.

As shown in FIG. 14, the user performs a rightward slide operation on the main screen interface to switch to a scene image corresponding to the menu interface 1, and if the user performs a leftward slide operation on the main screen interface, the main screen interface is switched to a scene image corresponding to the menu interface 2. Each menu interface corresponds to a different photographing direction, so that photographed background images are different, and positions of the target object relative to the background images are different. For example, as shown in FIG. 14, content presented in backgrounds of the menu interface 2, the main screen interface, and the menu interface 1 is different, and the positions of the target object relative to the background images are different.

Figure 15:
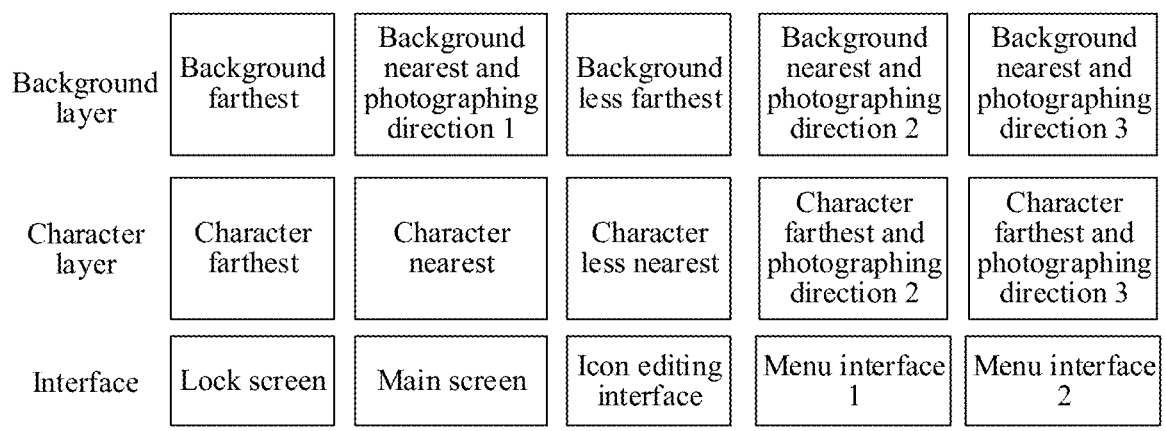
FIG. 15 exemplarily shows a schematic diagram of photographing distances and photographing directions corresponding various preset interfaces.

FIG. 15 shows a schematic diagram of photographing distances and photographing directions corresponding to various preset interfaces.

As shown in FIG. 15, a photographing distance corresponding to the lock screen interface is farthest, photographing directions corresponding to the lock screen interface, the main screen interface, and the icon editing interface are all a photographing direction 1, a photographing height corresponding to the lock screen interface may be higher than a photographing height of the icon editing interface, and the photographing height of the icon editing interface may be higher than a photographing height corresponding to the main screen interface. Photographing distances of the menu interface 1 and the menu interface 2 are the same as a photographing distance of the main screen interface, a photographing direction of the menu interface 1 is a photographing direction 2, and a photographing direction of the menu interface 2 is a photographing direction 3.

In this example, the mobile phone obtains different scene images through different photographing viewing angles (that is, photographing directions). When an operation of switching from the main screen interface to the menu interface is detected, the mobile phone obtains a target video of gradually changing from the scene image of the main screen interface to the scene image of the menu interface. Since the photographing direction of the main screen interface is different from the photographing direction of the menu interface, the target video may present a dynamic visual effect of leftward movement or rightward movement of photographing, and since the leftward movement or rightward movement visual effect matches the slide operation of the finger of the user, interaction experience between the user and wallpaper display is further improved.

Figure 16:
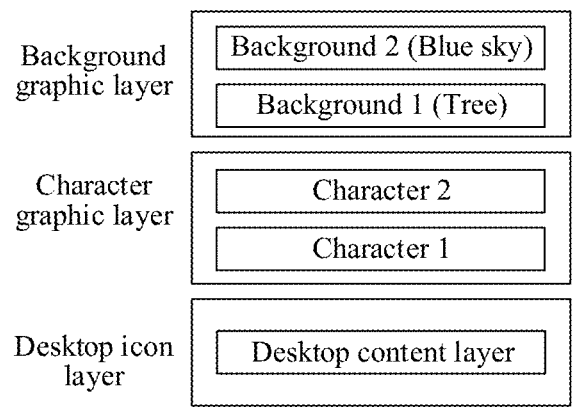
FIG. 16 exemplarily shows a schematic diagram of a plurality of graphic layers.

In some embodiments, the background graphic layer may further include a plurality of background layers, and the character graphic layer may further include a plurality of character layers. As shown in FIG. 16, the background graphic layer includes two background layers, which are respectively a background 1 and a background 2. The character graphic layer includes two character layers, which are respectively a character 1 and a character 2. The desktop icon layer is located above all graphic layers. In this example, there are a plurality of background graphic layers and there are a plurality of character graphic layers, so that the flexibility of user customization may be improved, different scenes may be freely combined, and the interestingness of the wallpaper is improved.

In some embodiments, when switching is performed between interfaces in the desktop, background images of the interfaces in the desktop may be different. That is, when switching is performed between two adjacent desktops, not only a viewing angle change effect may be added, but also a background image switching effect may be added, thereby further improving the interestingness of the wallpaper and the interactivity with the user.

For example, the mobile phone obtains, in response to a second select operation of the user, an image corresponding to a background graphic layer of each menu interface and an image corresponding to a background graphic layer of the main screen interface from a gallery, where the image corresponding to the background graphic layer of the main screen interface is different from the image corresponding to the background graphic layer of the menu interface. The mobile phone adjusts a position and a size of an image respectively corresponding to each graphic layer. The mobile phone obtains, in response to an interface switching operation, a target video of changing from a scene image of a current preset interface to a scene image of a next preset interface. The mobile phone uses the target video as a wallpaper of the electronic device, and displays the wallpaper.

Figure 17:
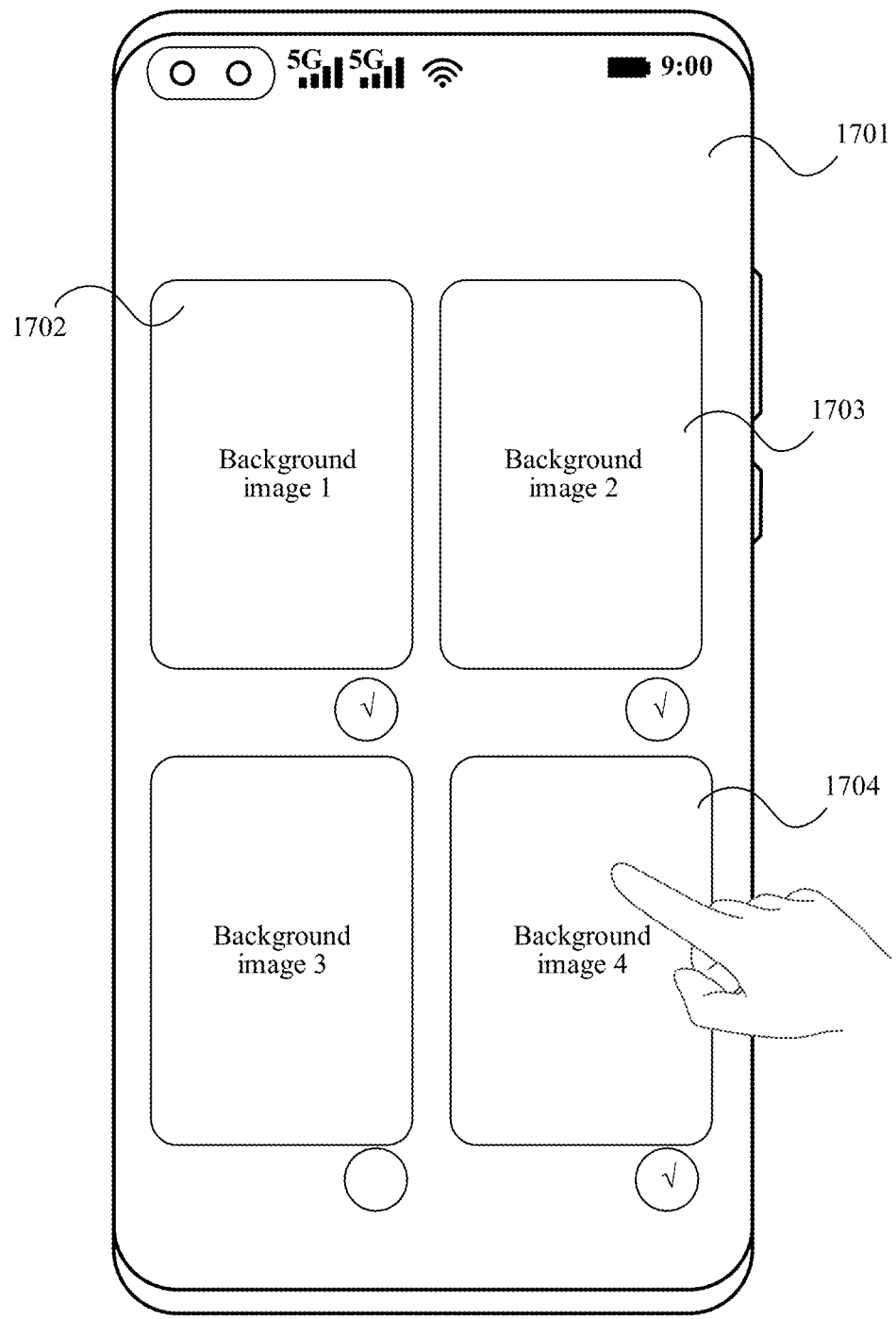
FIG. 17 exemplarily shows a schematic diagram of a scenario in which a user selects a plurality of background images.

Specifically, as shown in FIG. 5B, the user taps the control 504, and the mobile phone invokes a picture in the gallery and displays the picture in response to the tap operation of the user. As shown in FIG. 17, a background image selection interface 1701 displays four background images. The user may select an image by tapping the image. As shown in FIG. 17, the user selects a background image 1702 (that is, a background image 1), a background image 1703 (that is, a background image 2), and a background image 1704 (that is, a background image 4). It should be noted that, the mobile phone may correspond to different menu interfaces and the main screen interface based on an arrangement sequence of the background images. For example, the mobile phone may use the background image 1 as a background image of the main screen interface, use the background image 2 as a background image of the menu interface 1, and use the background image 4 as a background image of the menu interface 2.

Optionally, the mobile phone may alternatively determine, in response to an operation of the user, background images respectively corresponding to each menu interface and the lock screen interface based on a specified operation of the user.

Figure 18:
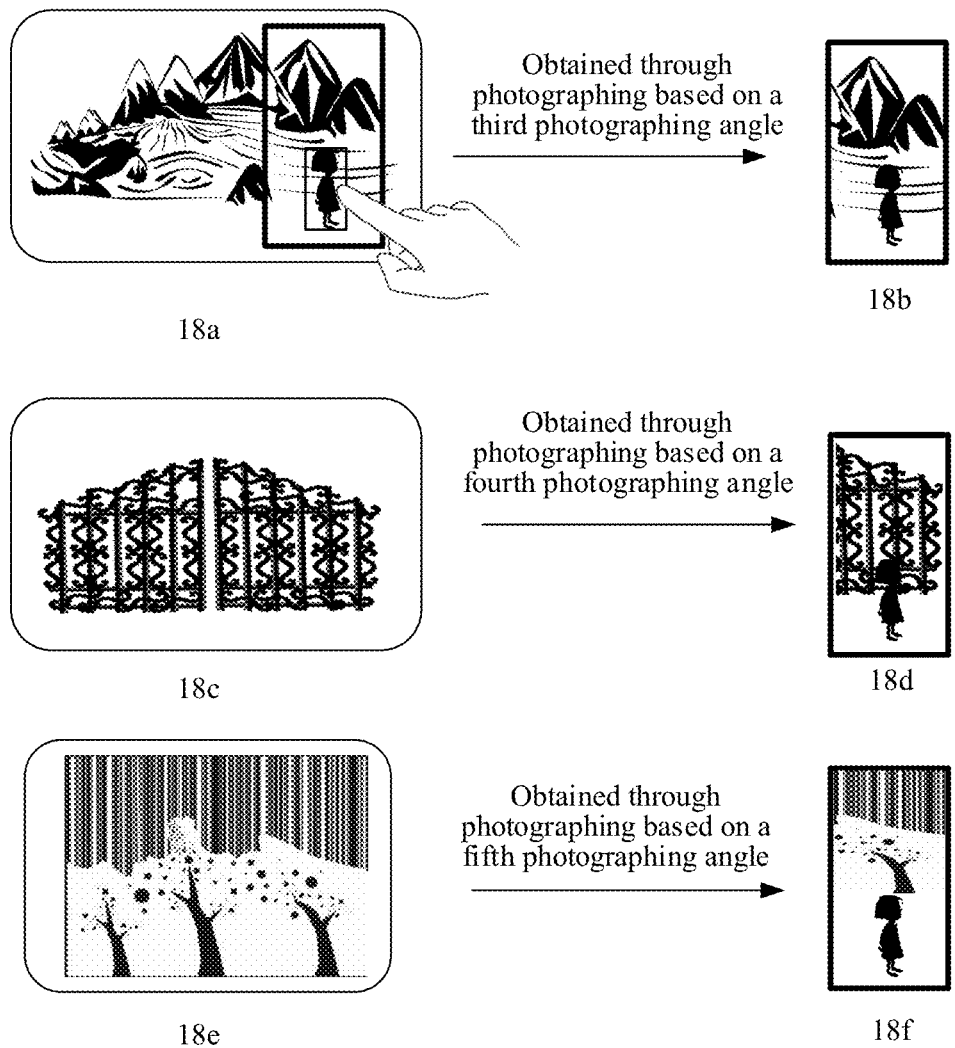
FIG. 18 exemplarily shows scene images corresponding to different interfaces.

FIG. 18 shows scene images corresponding to different interfaces.

As shown in 18a of FIG. 18, the mobile phone adjusts the sizes and the positions of the background image and the target object in response to an adjustment operation of the user. For a detailed adjustment process, reference may be made to the related description in step 402, and details are not described herein again. As shown in 18b, the virtual camera obtains the scene image of the main screen interface after performing photographing based on the first photographing angle. After the positions and the sizes of the background image 1 and the character image are adjusted, the mobile phone may further adjust the character image based on the sizes of the background image 2 and the background 4. It should be noted that, after the position of the character image is determined, a position of the character image in the display screen is not changed.

The mobile phone may adjust the size and the position of the background image 2 based on an adjustment operation of the user on the background image 2, and similarly, the mobile phone adjusts the size and the position of the background image 4 in response to an operation of the user.

After the sizes and the positions of all the background images are adjusted and the position of the character image is determined, the virtual camera may photograph the scene including all the graphic layers based on respectively corresponding photographing parameters, to obtain a scene image of a corresponding preset interface. Optionally, the main screen interface corresponds to the third photographing angle, the menu interface 1 corresponds to a fourth photographing angle, and the menu interface 2 corresponds to a fifth photographing angle. A photographing distance of the third photographing angle, a photographing distance of the fourth photographing angle, and a photographing distance of the fifth photographing angle are the same, and a photographing direction of the third photographing angle, a photographing direction of the fourth photographing angle, and a photographing direction of the fifth photographing angle are different. For the photographing directions, reference may be made to the photographing directions shown in FIG. 13, and details are not described herein again.

As shown in FIG. 18, 18c shows the background image 2, and the virtual camera photographs a scene including the background image 2 and the character image based on the fourth photographing angle, to obtain a scene image shown in 18d, where the scene image (that is, 18d) is a scene image corresponding to the menu interface 1. 18e shows the background image 4, and the virtual camera photographs a scene including the background image 4 and the character image based on the fifth photographing angle, to obtain a scene image shown in 18f, where the scene image (that is, 18f) is a scene image corresponding to the menu interface 2.

In this example, the mobile phone may pre-generate a target video of switching from the main screen interface to the menu interface 1 and a target video of switching from the menu interface 1 to the menu interface 2. For generation processes of the target videos, reference may be made to the related description in step 403, and details are not described herein again.

Figure 19:
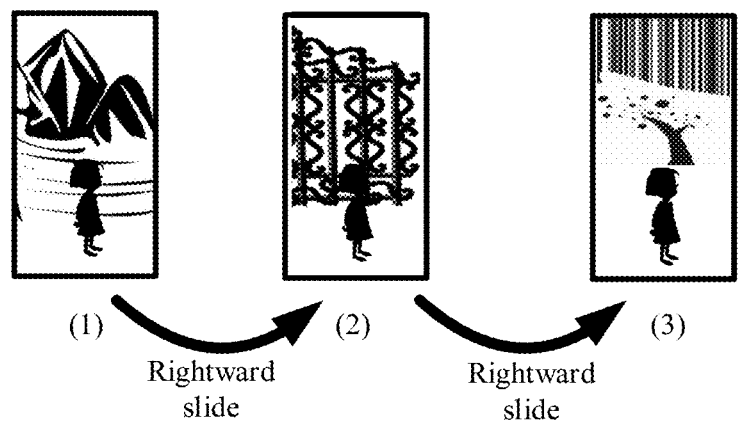
FIG. 19 exemplarily shows a schematic diagram of switching between adjacent interfaces.

FIG. 19 exemplarily shows a schematic diagram of switching between adjacent interfaces.

As shown in FIG. 19, the scene image corresponding to the main screen interface is shown in (1), and the user performs a rightward slide operation on the screen. The mobile phone detects the rightward slide operation of the user, obtains a target video A of gradually changing from the scene image of the main screen interface (that is, (1) of FIG. 19) to the scene image of the menu interface 1 (that is, (2) of FIG. 19), and displays the target video A. If the user performs a rightward slide operation on the menu interface 1, the mobile phone detects the rightward slide operation of the user, obtains a target video B of gradually changing from the scene image of the menu interface 1 (that is, (2) of FIG. 19) to the scene image of the menu interface 2 (that is, (3) of FIG. 19), and displays the target video B.

In some embodiments, when switching is performed between adjacent interfaces, the mobile phone may directly change to the scene image of the next preset interface. The wallpaper displayed method may include the following steps:

Step 2001: The mobile phone obtains, in response to a second select operation of a user, an image corresponding to a background graphic layer of each menu interface and an image corresponding to a background graphic layer of a main screen interface from a gallery, where the image corresponding to the background graphic layer of the main screen interface is different from the image corresponding to the background graphic layer of the menu interface, and both the menu interface and the main screen interface belong to desktops.

For this step, reference may be made to the related description in FIG. 17, and details are not described herein again.

Step 2002: The mobile phone adjusts a position and a size of an image respectively corresponding to each graphic layer.

Step 2003: The mobile phone obtains, in response to a desktop switching operation, a scene image of a next to-be-displayed interface, where the scene image of the next to-be-displayed interface is obtained by a virtual camera by photographing a scene including all graphic layers based on a photographing angle corresponding to the next to-be-displayed interface, and the desktop switching operation is used for indicating switching between adjacent desktops.

Specifically, for obtaining of the scene image of the next preset interface, reference may be made to the related description in FIG. 18. Optionally, the main screen interface, the menu interface 1, and the menu interface 2 use a same photographing angle (for example, the first photographing angle). The virtual camera photographs the scene including the background image 2 and the character image based on the first photographing angle, to obtain the scene image corresponding to the menu interface 1. The virtual camera photographs the scene including the background image 4 and the character image based on the first photographing angle, to obtain the scene image corresponding to the menu interface 2.

Step 2004: The mobile phone displays the scene image corresponding to the next to-be-displayed interface.

When the mobile phone detects a switching operation, the mobile phone displays the scene image corresponding to the next preset interface.

In this example, when the mobile phone detects an interface switching operation, the mobile phone directly displays the scene image corresponding to the next preset interface, so that the background image is changed quickly, and the target object is located in different background images, thereby improving the interestingness of the wallpaper and improving the interactivity between the wallpaper and the user.

It may be understood that, to implement the foregoing functions, the electronic device includes corresponding hardware and/or software modules for performing the functions. Algorithm steps in the examples described with reference to the embodiments disclosed in this specification can be implemented by hardware or a combination of hardware and computer software in this application. Whether a function is performed by hardware or computer software driving hardware depends on particular applications and design constraints of the technical solutions. A person of skill in the art may use different methods to implement the described functions with reference to the embodiments for each particular application, but it should not be considered that the implementation goes beyond the scope of this application.

An embodiment further provides a computer storage medium. The computer storage medium stores computer instructions. The computer instructions, when run on an electronic device, cause the electronic device to perform the related method steps to implement the wallpaper display method in the foregoing embodiments. The storage medium includes: any medium that can store program code, such as a USB flash drive, a removable hard disk, a read-only memory (read-only memory, ROM), a random access memory (random access memory, RAM), a magnetic disk, or an optical disc.

An embodiment further provides a computer program product. When the computer program product is run on a computer, the computer is caused to perform the related steps, to implement the wallpaper display method in the foregoing embodiments.

The electronic device, the computer storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

Any content of the embodiments of this application and any content of a same embodiment may be freely combined. Any combination of the foregoing content falls within the scope of this application.

The embodiments of this application have been described above with reference to the accompanying drawings. This application is not limited to the specific embodiments described above, and the specific embodiments described above are merely exemplary and not limitative. A person of ordinary skill in the art may make various variations under the enlightenment of this application without departing from the spirit of this application and the protection scope of the claims, and such variations shall all fall within the protection scope of this application.

What is claimed is:

1. A wallpaper display method, applied to an electronic device, the method comprising:
    setting, a first image in a gallery as a wallpaper, wherein the first image comprises a first background image and a first character image;
    in response to a first operation of switching to a desktop, displaying, a first interface of the desktop, wherein the first interface comprises a first application icon, a second background image and a second character image, the first application icon is located above the second character image, the second character image is located above the second background image, the second background image is a part of the first background image from a first viewing angle, and the second character image is a part of the first character image from the first viewing angle;
    in response to a first gesture on the first interface, displaying, a second interface of the desktop, wherein the second interface comprises a second application icon, a third background image and a third character image, the second application icon is located above the third character image, the third character image is located above the third background image, the third background image is a part of the first background image from a second viewing angle, the third character image is a part of the first character image from the second viewing angle, and the second viewing angle is different from the first viewing angle;
    in response to a second gesture on the first interface, displaying a third interface of the desktop, wherein the third interface comprises a third application icon, a fourth background image and a fourth character image, the third application icon is located above the fourth character image, the fourth character image is located above the fourth background image, the fourth background image is a part of the first background image from a third viewing angle, the fourth character image is a part of the first character image from the third viewing angle, and the third viewing angle is different from the first viewing angle.

2. The method according to claim 1, wherein when a direction of the first gesture is opposite to a direction of the second gesture, the second viewing angle and the third viewing angle are symmetrical with respect to the first viewing angle.

3. The method according to claim 1, wherein the first gesture is a slide operation, and the second gesture is a slide operation.

4. The method according to claim 1, wherein a first distance is equal to a second distance, wherein the first distance is a distance between the third character image and the third background image in the second viewing angle, and the second distance is a distance between the fourth character image and the fourth background image in the third viewing angle.

5. The method according to claim 1, wherein the method further comprises:
 after setting a first image in a gallery as a wallpaper,
 in response to a second operation of switching to a lock screen interface, displaying, a lock screen interface, wherein the lock screen interface comprises a fifth background image and a fifth character image, the fifth character image is located above the fifth background image, the fifth background image is a part of the first background image from a fourth viewing angle, the fifth character image is a part of the first character image from the fourth viewing angle, and the fourth viewing angle is different from the first viewing angle.

6. The method according to claim 5, wherein a third distance is different from a fourth distance, wherein the third distance is a distance between the fifth character image and the fifth background image in the fourth viewing angle, and the fourth distance is a distance between the second character image and the second background image in the first viewing angle.

7. The method according to claim 1, wherein the method further comprises:
 obtaining a scene image corresponding to the desktop;
 generating, based on each preset interface switching relationship and the scene image corresponding to each preset interface, a video matching each interface switching relationship, wherein the interface switching relationship is used for indicating a correspondence between an interface before switching and an interface after switching; and
 obtaining, based on the interface switching relationship, a video matching the interface switching relationship as the target video.

8. The method according to claim 7, wherein the obtaining the scene image corresponding to the desktop comprises:
 obtaining a photographing angle corresponding to the desktop, wherein the photographing angle comprises: a photographing distance, a photographing height, and a photographing direction;
 obtaining a focusing position in the first image; and
 indicating a virtual camera to focus on the focusing position and photograph the scene comprising the first image based on the photographing angle corresponding to the preset interface, to obtain the scene image corresponding to the desktop.

9. The method according to claim 8, wherein the obtaining a focusing position in the first image comprises:
 obtaining an object in a top graphic layer,
 detecting whether the object in the top graphic layer is complete;
 dividing, if detecting that the object in the top graphic layer is complete, the object in the top graphic layer into n photographing regions at equal proportions in a first direction; and obtaining a center position of a first photographing region as the focusing position, wherein the first photographing region is a first photographing region or an $n^{th}$ photographing region in the first direction, and n is an integer greater than 1; or
 dividing, if detecting that the object in the top graphic layer is not complete, the object in the top graphic layer into m photographing regions at equal proportions in the first direction; and
 obtaining a center position of a second photographing region as the focusing position, wherein the second photographing region is a first photographing region or an $mt^{th}$ photographing region in the first direction, and $1<m\le n$ and m is an integer.

10. An electronic device, comprising:
 one or more processors;
 a memory; and
 one or more computer programs, wherein the one or more computer programs are stored on the memory, and when the computer programs are executed by the one or more processors, the electronic device is caused to perform the following steps:
 setting, a first image in a gallery as a wallpaper, wherein the first image comprises a first background image and a first character image;
 in response to a first operation of switching to a desktop, displaying, a first interface of the desktop, wherein the first interface comprises a first application icon, a second background image and a second character image, the first application icon is located above the second character image, the second character image is located above the second background image, the second background image is a part of the first background image from a first viewing angle, and the second character image is a part of the first character image from the first viewing angle;
 in response to a first gesture on the first interface, displaying, a second interface of the desktop, wherein the second interface comprises a second application icon, a third background image and a third character image, the second application icon is located above the third character image, the third character image is located above the third background image, the third background image is a part of the first background image from a second viewing angle, the third character image is a part of the first character image from the second viewing angle, and the second viewing angle is different from the first viewing angle;
 in response to a second gesture on the first interface, displaying a third interface of the desktop, wherein the third interface comprises a third application icon, a fourth background image and a fourth character image, the third application icon is located above the fourth character image, the fourth character image is located above the fourth background image, the fourth background image is a part of the first background image from a third viewing angle, the fourth character image is a part of the first character image from the third viewing angle, and the third viewing angle is different from the first viewing angle.

11. The electronic device according to claim 10, wherein when a direction of the first gesture is opposite to a direction of the second gesture, the second viewing angle and the third viewing angle are symmetrical with respect to the first viewing angle.

12. The electronic device according to claim 10, wherein the first gesture is a slide operation, and the second gesture is a slide operation.

13. The electronic device according to claim 10, wherein a first distance is equal to a second distance, wherein the first distance is a distance between the third character image and the third background image in the second viewing angle, and the second distance is a distance between the fourth character image and the fourth background image in the third viewing angle.

14. The electronic device according to claim 10, wherein the steps further comprise:
   after setting a first image in a gallery as a wallpaper,
   in response to a second operation of switching to a lock screen interface, displaying, a lock screen interface, wherein the lock screen interface comprises a fifth background image and a fifth character image, the fifth character image is located above the fifth background image, the fifth background image is a part of the first background image from a fourth viewing angle, the fifth character image is a part of the first character image from the fourth viewing angle, and the fourth viewing angle is different from the first viewing angle.

15. The electronic device according to claim 14, wherein a third distance is different from a fourth distance, wherein the third distance is a distance between the fifth character image and the fifth background image in the fourth viewing angle, and the fourth distance is a distance between the second character image and the second background image in the first viewing angle.

16. The electronic device according to claim 10, wherein the steps further comprise:
   obtaining a scene image corresponding to the desktop;
   generating, based on each preset interface switching relationship and the scene image corresponding to each preset interface, a video matching each interface switching relationship, wherein the interface switching relationship is used for indicating a correspondence between an interface before switching and an interface after switching; and
   obtaining, based on the interface switching relationship, a video matching the interface switching relationship as the target video.

17. The electronic device according to claim 16, wherein the obtaining the scene image corresponding to the desktop comprises:
   obtaining a photographing angle corresponding to the desktop, wherein the photographing angle comprises: a photographing distance, a photographing height, and a photographing direction;
   obtaining a focusing position in the first image; and
   indicating a virtual camera to focus on the focusing position and photograph the scene comprising the first image based on the photographing angle corresponding to the preset interface, to obtain the scene image corresponding to the desktop.

18. The electronic device according to claim 17, wherein the obtaining a focusing position in the first image comprises:
   obtaining an object in a top graphic layer;
   detecting whether the object in the top graphic layer is complete;
   dividing, if detecting that the object in the top graphic layer is complete, the object in the top graphic layer into n photographing regions at equal proportions in a first direction; and
   obtaining a center position of a first photographing region as the focusing position, wherein the first photographing region is a first photographing region or an nth photographing region in the first direction, and n is an integer greater than 1; or
   dividing, if detecting that the object in the top graphic layer is not complete, the object in the top graphic layer into m photographing regions at equal proportions in the first direction; and
   obtaining a center position of a second photographing region as the focusing position, wherein the second photographing region is a first photographing region or an $m^{th}$ photographing region in the first direction, and $1 < m \leq n$ and m is an integer.

19. The electronic device according to claim 10, wherein the first image comprises a two-dimensional image or a three-dimensional image.

20. A non-transitory computer-readable storage medium, comprising a computer program, wherein when the computer program is run on an electronic device, the electronic device is caused to perform the following steps:
   setting, a first image in a gallery as a wallpaper, wherein the first image comprises a first background image and a first character image;
   in response to a first operation of switching to a desktop, displaying, a first interface of the desktop, wherein the first interface comprises a first application icon, a second background image and a second character image, the first application icon is located above the second character image, the second character image is located above the second background image, the second background image is a part of the first background image from a first viewing angle, and the second character image is a part of the first character image from the first viewing angle;
   in response to a first gesture on the first interface, displaying, a second interface of the desktop, wherein the second interface comprises a second application icon, a third background image and a third character image, the second application icon is located above the third character image, the third character image is located above the third background image, the third background image is a part of the first background image from a second viewing angle, the third character image is a part of the first character image from the second viewing angle, and the second viewing angle is different from the first viewing angle;
   in response to a second gesture on the first interface, displaying a third interface of the desktop, wherein the third interface comprises a third application icon, a fourth background image and a fourth character image, the third application icon is located above the fourth character image, the fourth character image is located above the fourth background image, the fourth background image is a part of the first background image from a third viewing angle, the fourth character image is a part of the first character image from the third viewing angle, and the third viewing angle is different from the first viewing angle.

* * * * *